(12) United States Patent
Modi et al.

(10) Patent No.: US 9,360,229 B2
(45) Date of Patent: Jun. 7, 2016

(54) FACILITATING AMBIENT TEMPERATURE MEASUREMENT ACCURACY IN AN HVAC CONTROLLER HAVING INTERNAL HEAT-GENERATING COMPONENTS

(71) Applicant: Google Inc., Mountain View, CA (US)

(72) Inventors: Yash Modi, Foster City, CA (US); Yoky Matsuoka, Palo Alto, CA (US); John B. Filson, Mountain View, CA (US)

(73) Assignee: Google Inc., Mountain View, CA (US)

( * ) Notice: Subject to any disclaimer, the term of this patent is extended or adjusted under 35 U.S.C. 154(b) by 421 days.

(21) Appl. No.: 13/871,734

(22) Filed: Apr. 26, 2013

(65) Prior Publication Data

US 2014/0324232 A1    Oct. 30, 2014

(51) Int. Cl.
    *G05D 23/19*     (2006.01)
    *F24F 11/00*     (2006.01)

(52) U.S. Cl.
    CPC ......... *F24F 11/0086* (2013.01); *F24F 11/0012* (2013.01); *G05D 23/1931* (2013.01); *F24F 2011/0068* (2013.01)

(58) Field of Classification Search
    CPC ............. G05D 23/1917; F24F 11/0012; F24F 11/0086; F24F 2011/0068
    USPC .......... 700/276, 278, 299, 300; 713/300, 320, 713/321; 236/91 F
    See application file for complete search history.

(56) References Cited

U.S. PATENT DOCUMENTS

| | | | |
|---|---|---|---|
| 3,991,357 | A | 11/1976 | Kaminski |
| 4,183,290 | A | 1/1980 | Kucharczyk |
| 4,223,831 | A | 9/1980 | Szarka |

(Continued)

FOREIGN PATENT DOCUMENTS

| | | |
|---|---|---|
| CA | 2202008 | 2/2000 |
| EP | 196069 | 12/1991 |

(Continued)

OTHER PUBLICATIONS

Aprilaire Electronic Thermostats Model 8355 User's ManualResearch Products Corporation, Dec. 2000, 16 pages.

(Continued)

*Primary Examiner* — Charles Kasenge
(74) *Attorney, Agent, or Firm* — Kilpatrick Townsend & Stockton LLP

(57) ABSTRACT

A thermostat may include one or more temperature sensors, and a processing system configured to be in operative communication with an HVAC system. The processing system may be configured to operate a first operating state characterized by relatively low power consumption and a corresponding relatively low associated heat generation, and a second operating state characterized by relatively high power consumption and a corresponding relatively high associated heat generation. During time intervals in which the processing system is operating in the first operating state, the processing system may process the temperature sensor measurements according to a first ambient temperature determination algorithm to compute the determined ambient temperature. During time intervals in which the processing system is operating in the second operating state, the processing system may process the temperature sensor measurements according to a second ambient temperature determination algorithm to compute the determined ambient temperature.

20 Claims, 12 Drawing Sheets

(56) References Cited

U.S. PATENT DOCUMENTS

| | | |
|---|---|---|
| 4,335,847 A | 6/1982 | Levine |
| 4,408,711 A | 10/1983 | Levine |
| 4,615,380 A | 10/1986 | Beckey |
| 4,674,027 A | 6/1987 | Beckey |
| 4,685,614 A | 8/1987 | Levine |
| 4,751,961 A | 6/1988 | Levine et al. |
| 4,897,798 A | 1/1990 | Cler |
| 4,971,136 A | 11/1990 | Mathur et al. |
| 5,088,645 A | 2/1992 | Bell |
| 5,211,332 A | 5/1993 | Adams |
| 5,240,178 A | 8/1993 | Dewolf et al. |
| 5,244,146 A | 9/1993 | Jefferson et al. |
| 5,395,042 A | 3/1995 | Riley et al. |
| 5,476,221 A | 12/1995 | Seymour |
| 5,499,196 A | 3/1996 | Pacheco |
| 5,555,927 A | 9/1996 | Shah |
| 5,611,484 A | 3/1997 | Uhrich |
| 5,808,294 A | 9/1998 | Neumann |
| 5,902,183 A | 5/1999 | D'Souza |
| 5,909,378 A | 6/1999 | De Milleville |
| 5,918,474 A | 7/1999 | Khanpara et al. |
| 5,977,964 A | 11/1999 | Williams et al. |
| 6,062,482 A | 5/2000 | Gauthier et al. |
| 6,066,843 A | 5/2000 | Scheremeta |
| 6,072,784 A | 6/2000 | Agrawal et al. |
| 6,095,427 A | 8/2000 | Hoium et al. |
| 6,098,893 A | 8/2000 | Berglund et al. |
| 6,213,404 B1 | 4/2001 | Dushane et al. |
| 6,216,956 B1 | 4/2001 | Ehlers et al. |
| 6,349,883 B1 | 2/2002 | Simmons et al. |
| 6,356,204 B1 | 3/2002 | Guindi et al. |
| 6,370,894 B1 | 4/2002 | Thompson et al. |
| 6,415,205 B1 | 7/2002 | Myron et al. |
| 6,478,233 B1 | 11/2002 | Shah |
| 6,645,066 B2 | 11/2003 | Gutta et al. |
| 6,769,482 B2 | 8/2004 | Wagner et al. |
| 6,990,821 B2 | 1/2006 | Singh et al. |
| 7,024,336 B2 | 4/2006 | Salsbury et al. |
| 7,149,727 B1 | 12/2006 | Nicholls et al. |
| 7,149,729 B2 | 12/2006 | Kaasten et al. |
| 7,188,482 B2 | 3/2007 | Sadegh et al. |
| 7,287,709 B2 | 10/2007 | Proffitt et al. |
| 7,379,791 B2 | 5/2008 | Tamarkin et al. |
| RE40,437 E | 7/2008 | Rosen |
| 7,469,550 B2 | 12/2008 | Chapman, Jr. et al. |
| 7,644,869 B2 | 1/2010 | Hoglund et al. |
| 7,702,424 B2 | 4/2010 | Cannon et al. |
| 7,784,704 B2 | 8/2010 | Harter |
| 7,802,618 B2 | 9/2010 | Simon et al. |
| 7,848,900 B2 | 12/2010 | Steinberg et al. |
| 7,849,698 B2 | 12/2010 | Harrod et al. |
| 7,854,389 B2 | 12/2010 | Ahmed |
| 8,010,237 B2 | 8/2011 | Cheung et al. |
| 8,019,567 B2 | 9/2011 | Steinberg et al. |
| 8,037,022 B2 | 10/2011 | Rahman et al. |
| 8,090,477 B1 | 1/2012 | Steinberg |
| 8,091,375 B2 | 1/2012 | Crawford |
| 8,131,497 B2 | 3/2012 | Steinberg et al. |
| 8,174,381 B2 | 5/2012 | Imes et al. |
| 8,180,492 B2 | 5/2012 | Steinberg |
| 8,219,249 B2 | 7/2012 | Harrod et al. |
| 8,558,179 B2 * | 10/2013 | Filson ................ G05D 23/1902 236/1 C |
| 9,016,593 B2 * | 4/2015 | Metselaar ........... F24F 11/0012 236/1 C |
| 2004/0249479 A1 | 12/2004 | Shorrock |
| 2005/0090915 A1 | 4/2005 | Geiwitz |
| 2005/0128067 A1 | 6/2005 | Zakrewski |
| 2005/0150968 A1 | 7/2005 | Shearer |
| 2005/0189429 A1 | 9/2005 | Breeden |
| 2005/0192915 A1 | 9/2005 | Ahmed et al. |
| 2005/0280421 A1 | 12/2005 | Yomoda et al. |
| 2006/0186214 A1 | 8/2006 | Simon et al. |
| 2006/0196953 A1 | 9/2006 | Simon et al. |
| 2007/0045431 A1 | 3/2007 | Chapman, Jr. et al. |
| 2007/0115902 A1 | 5/2007 | Shamoon et al. |
| 2007/0205297 A1 | 9/2007 | Finkam et al. |
| 2008/0015742 A1 | 1/2008 | Kulyk et al. |
| 2008/0173034 A1 * | 7/2008 | Shaw ....................... F25B 13/00 62/160 |
| 2008/0183335 A1 | 7/2008 | Poth et al. |
| 2008/0191045 A1 | 8/2008 | Harter |
| 2008/0273754 A1 | 11/2008 | Hick et al. |
| 2008/0317292 A1 | 12/2008 | Baker et al. |
| 2009/0171862 A1 | 7/2009 | Harrod et al. |
| 2009/0254225 A1 | 10/2009 | Boucher et al. |
| 2009/0259713 A1 | 10/2009 | Blumrich et al. |
| 2009/0297901 A1 | 12/2009 | Kilian et al. |
| 2009/0327354 A1 | 12/2009 | Resnick et al. |
| 2010/0019051 A1 | 1/2010 | Rosen |
| 2010/0025483 A1 | 2/2010 | Hoeynck et al. |
| 2010/0050004 A1 | 2/2010 | Hamilton, II et al. |
| 2010/0070084 A1 | 3/2010 | Steinberg et al. |
| 2010/0070086 A1 | 3/2010 | Harrod et al. |
| 2010/0070234 A1 | 3/2010 | Steinberg et al. |
| 2010/0084482 A1 | 4/2010 | Kennedy et al. |
| 2010/0167783 A1 | 7/2010 | Alameh et al. |
| 2010/0179704 A1 | 7/2010 | Ozog |
| 2010/0211224 A1 | 8/2010 | Keeling et al. |
| 2010/0262298 A1 | 10/2010 | Johnson et al. |
| 2010/0262299 A1 | 10/2010 | Cheung et al. |
| 2010/0280667 A1 | 11/2010 | Steinberg |
| 2010/0289643 A1 | 11/2010 | Trundle et al. |
| 2010/0308119 A1 | 12/2010 | Steinberg et al. |
| 2010/0318227 A1 | 12/2010 | Steinberg et al. |
| 2011/0046792 A1 | 2/2011 | Imes et al. |
| 2011/0046805 A1 | 2/2011 | Bedros et al. |
| 2011/0046806 A1 | 2/2011 | Nagel et al. |
| 2011/0077758 A1 | 3/2011 | Tran et al. |
| 2011/0077896 A1 | 3/2011 | Steinberg et al. |
| 2011/0151837 A1 | 6/2011 | Winbush, III |
| 2011/0160913 A1 | 6/2011 | Parker et al. |
| 2011/0185895 A1 | 8/2011 | Freen |
| 2011/0307103 A1 | 12/2011 | Cheung et al. |
| 2011/0307112 A1 | 12/2011 | Barrilleaux |
| 2012/0017611 A1 | 1/2012 | Coffel et al. |
| 2012/0065935 A1 | 3/2012 | Steinberg et al. |
| 2012/0085831 A1 | 4/2012 | Kopp |
| 2012/0101637 A1 | 4/2012 | Imes et al. |
| 2012/0158350 A1 | 6/2012 | Steinberg et al. |
| 2012/0221151 A1 | 8/2012 | Steinberg |
| 2012/0248210 A1 * | 10/2012 | Warren ................ F24F 11/0012 236/1 C |
| 2012/0252430 A1 | 10/2012 | Imes et al. |
| 2013/0018513 A1 * | 1/2013 | Metselaar ........... F24F 11/0012 700/278 |
| 2013/0099124 A1 * | 4/2013 | Filson ................ G05D 23/1902 250/349 |

FOREIGN PATENT DOCUMENTS

| | | |
|---|---|---|
| JP | 59106311 | 6/1984 |
| JP | 01252850 | 10/1989 |
| WO | 2014/176176 A1 | 10/2014 |

OTHER PUBLICATIONS

Braeburn 5300 Installer Guide, Braeburn Systems, LLC, Dec. 9, 2009, 10 pages.

Braeburn Model 5200, Braeburn Systems, LLC, Jul. 20, 2011, 11 pages.

Ecobee Smart Si Thermostat Installation Manual, Ecobee, Apr. 3, 2012, 40 pages.

Ecobee Smart Si Thermostat User Manual, Ecobee, Apr. 3, 2012, 44 pages.

Ecobee Smart Thermostat Installation Manual, Jun. 29, 2011, 20 pages.

Ecobee Smart Thermostat User Manual, May 11, 2010, 20 pages.

Electric Heat Lock Out on Heat Pumps, Washington State University Extension Energy Program, Apr. 2010, pp. 1-3.

Honeywell Installation Guide FocusPRO TH6000 Series, Honeywell International, Inc., Jan. 5, 2012, 24 pages.

(56) References Cited

OTHER PUBLICATIONS

Honeywell Operating Manual FocusPRO TH6000 Series, Honeywell International, Inc., Mar. 25, 2011, 80 pages.
Honeywell Prestige THX9321 and TXH9421 Product Data, Honeywell International, Inc., 68-0311, Jan. 2012, 126 pages.
Honeywell Prestige THX9321-9421 Operating Manual, Honeywell International, Inc., Jul. 6, 2011, 120 pages.
Hunter Internet Thermostat Installation Guide, Hunter Fan Co., Aug. 14, 2012, 8 pages.
Introducing the New Smart Si Thermostat, Datasheet [online], retrieved from the Internet: <URL: https://www.ecobee.com/solutions/home/smart-si/> [retrieved on Feb. 25, 2013], Ecobee, Mar. 12, 2012, 4 pages.
Lennox ComfortSense 5000 Owners Guide, Lennox Industries, Inc., Feb. 2008, 32 pages.
Lennox ComfortSense 7000 Owners Guide, Lennox Industries, Inc., May 2009, 15 pages.
Lennox iComfort Manual, Lennox Industries, Inc., Dec. 2010, 20 pages.
Lux PSPU732T Manual, Lux Products Corporation, Jan. 6, 2009, 48 pages.
NetX RP32—Wifi Network Thermostat Consumer Brochure, Network Thermostat, May 2011, 2 pages.
NetX RP32—Wifi Network Thermostat Specification Sheet, Network Thermostat, Feb. 28, 2012, 2 pages.
RobertShaw Product Manual 9620, Maple Chase Company, Jun. 12, 2001, 14 pages.
RobertShaw Product Manual 9825i2, Maple Chase Company, Jul. 17, 2006, 36 pages.
SYSTXCCUIZ01-V Infinity Control Installation Instructions, Carrier Corp, May 31, 2012, 20 pages.
T8611G Chronotherm IV Deluxe Programmable Heat Pump Thermostat Product Data, Honeywell International Inc., Oct. 1997, 24 pages.
TB-PAC, TB-PHP, Base Series Programmable Thermostats, Carrier Corp, May 14, 2012, 8 pages.
The Perfect Climate Comfort Center PC8900A W8900A-C Product Data Sheet, Honeywell International Inc., Apr. 2001, 44 pages.
TP-PAC, TP-PHP, TP-NAC, TP-NHP Performance Series AC/HP Thermostat Installation Instructions, Carrier Corp, Sep. 2007, 56 pages.
Trane Communicating Thermostats for Fan Coil, Trane, May 2011, 32 pages.
Trane Communicating Thermostats for Heat Pump Control, Trane, May 2011, 32 pages.
Trane Install XL600 Installation Manual, Trane, Mar. 2006, 16 pages.
Trane XL950 Installation Guide, Trane, Mar. 2011, 20 pages.
Venstar T2900 Manual, Venstar, Inc., Apr. 2008, 113 pages.
Venstar T5800 Manual, Venstar, Inc., Sep. 7, 2011, 63 pages.
VisionPRO TH8000 Series Installation Guide, Honeywell International, Inc., Jan. 2012, 12 pages.
VisionPRO TH8000 Series Operating Manual, Honeywell International, Inc., Mar. 2011, 96 pages.
VisionPRO Wi-Fi Programmable Thermostat User Guide, Honeywell International, Inc., Aug. 2012, 48 pages.
White Rodgers (Emerson) Model 1F81-261 Installation and Operating Instructions, White Rodgers, Apr. 15, 2010, 8 pages.
White Rodgers (Emerson) Model IF98EZ-1621 Homeowner's User Guide, White Rodgers, Jan. 25, 2012, 28 pages.
Akhlaghinia et al., Occupancy Monitoring in Intelligent Environment through Integrated Wireless Localizing Agents, IEEE, 2009, 7 pages.
Akhlaghinia et al., Occupant Behaviour Prediction in Ambient Intelligence Computing Environment, Journal of Uncertain Systems, vol. 2, No. 2, 2008, pp. 85-100.
Allen et al., Real-Time Earthquake Detection and Hazard Assessment by ElarmS Across California, Geophysical Research Letters, vol. 36, L00B08, 2009, pp. 1-6.
Chatzigiannakis et al., Priority Based Adaptive Coordination of Wireless Sensors and Actors, Q2SWinet '06, Oct. 2006, pp. 37-44.
Deleeuw, Ecobee WiFi Enabled Smart Thermostat Part 2: The Features Review, retrieved from <URL: http://www.homenetworkenabled.com/content.php?136-ecobee-WiFi-enabled-Smart-Thermostat-Part-2-The-Features-review> [retrieved on Jan. 8, 2013], Dec. 2, 2011, 5 pages.
Gao et al., The Self-Programming Thermostat: Optimizing Setback Schedules Based on Home Occupancy Patterns, In Proceedings of the First ACM Workshop on Embedded Sensing Systems for Energy-Efficiency in Buildings, Nov. 3, 2009, 6 pages.
Loisos et al., Buildings End-Use Energy Efficiency: Alternatives to Compressor Cooling, California Energy Commission, Public Interest Energy Research, Jan. 2000, 80 pages.
Lu et al., The Smart Thermostat: Using Occupancy Sensors to Save Energy in Homes, In Proceedings of the 8th ACM Conference on Embedded Networked Sensor Systems, Nov. 3-5, 2010, pp. 211-224.
Mozer, The Neural Network House: An Environmental that Adapts to its Inhabitants, Proceedings of the American Association for Artificial Intelligence SS-98-02, 1998, pp. 110-114.
Ros et al., Multi-Sensor Human Tracking with the Bayesian Occupancy Filter, IEEE, 2009, 8 pages.
Wong et al., Maximum Likelihood Estimation of ARMA Model with Error Processes for Replicated Observations, National University of Singapore, Department of Economics, Working Paper No. 0217, Feb. 2002, pp. 1-19.
International Search Report and Written Opinion mailed Aug. 28, 2014 for PCT/US2014/034836 filed on Apr. 21, 2014, 15 pages.

\* cited by examiner

FACILITATING AMBIENT TEMPERATURE MEASUREMENT ACCURACY IN AN HVAC CONTROLLER HAVING INTERNAL HEAT-GENERATING COMPONENTS

TECHNICAL FIELD

This patent specification relates to systems and methods for the monitoring and control of energy-consuming systems or other resource-consuming systems. More particularly, this patent specification relates to control units that govern the operation of energy-consuming systems, household devices, or other resource-consuming systems, including methods for activating electronic displays for thermostats that govern the operation of heating, ventilation, and air conditioning (HVAC) systems.

BACKGROUND OF THE INVENTION

Substantial effort and attention continue toward the development of newer and more sustainable energy supplies. The conservation of energy by increased energy efficiency remains crucial to the world's energy future. According to an October 2010 report from the U.S. Department of Energy, heating and cooling account for 56% of the energy use in a typical U.S. home, making it the largest energy expense for most homes. Along with improvements in the physical plant associated with home heating and cooling (e.g., improved insulation, higher efficiency furnaces), substantial increases in energy efficiency can be achieved by better control and regulation of home heating and cooling equipment.

As discussed in the technical publication No. 50-8433, entitled "Power Stealing Thermostats" from Honeywell (1997), early thermostats used a bimetallic strip to sense temperature and respond to temperature changes in the room. The movement of the bimetallic strip was used to directly open and close an electrical circuit. Power was delivered to an electromechanical actuator, usually relay or contractor in the HVAC equipment whenever the contact was closed to provide heating and/or cooling to the controlled space. Since these thermostats did not require electrical power to operate, the wiring connections were very simple. Only one wire connected to the transformer and another wire connected to the load. Typically, a 24 VAC power supply transformer, the thermostat, and 24 VAC HVAC equipment relay were all connected in a loop with each device having only two required external connections.

When electronics began to be used in thermostats, the fact that the thermostat was not directly wired to both sides of the transformer for its power source created a problem. This meant that the thermostat had to be hardwired directly from the system transformer. Direct hardwiring a common "C" wire from the transformer to the electronic thermostat may be very difficult and costly.

Because many households do not have a direct wire from the system transformer (such as a "C" wire), some thermostats have been designed to derive power from the transformer through the equipment load. The methods for powering an electronic thermostat from the transformer with a single direct wire connection to the transformer are called "power stealing" or "power sharing" methods. The thermostat "steals," "shares," or "harvests" its power during the "OFF" periods of the heating or cooling system by allowing a small amount of current to flow through it into the load coil below the load coil's response threshold (even at maximum transformer output voltage). During the "ON" periods of the heating or cooling system the thermostat draws power by allowing a small voltage drop across itself. Ideally, the voltage drop will not cause the load coil to dropout below its response threshold (even at minimum transformer output voltage). Examples of thermostats with power stealing capability include the Honeywell T8600, Honeywell T8400C, and the Emerson Model 1F97-0671. However, these systems do not have power storage means and therefore must always rely on power stealing.

Additionally, microprocessor controlled "intelligent" thermostats may have more advanced environmental control capabilities that can save energy while also keeping occupants comfortable. To do this, these thermostats require more information from the occupants as well as the environments where the thermostats are located. These thermostats may also be capable of connection to computer networks, including both local area networks (or other "private" networks) and wide area networks such as the Internet (or other "public" networks), in order to obtain current and forecasted outside weather data, cooperate in so-called demand-response programs (e.g., automatic conformance with power alerts that may be issued by utility companies during periods of extreme weather), enable users to have remote access and/or control thereof through their network-connected device (e.g., smartphone, tablet computer, PC-based web browser), and other advanced functionalities that may require network connectivity.

BRIEF SUMMARY OF THE INVENTION

In one embodiment, a thermostat may be presented. The thermostat may include a housing, a user interface, and one or more temperature sensors, each of the one or more temperature sensors being configured to provide temperature sensor measurements, where said one or more temperature sensors includes a first temperature sensor, a second temperature sensor, and a third temperature sensor, each being positioned at different locations relative to the housing. The thermostat may also include a processing system disposed within the housing, the processing system being configured to be in operative communication with the one or more temperature sensors to receive the temperature sensor measurements, in operative communication with one or more input devices including said user interface for determining a setpoint temperature, and in still further operative communication with a heating, ventilation, and air conditioning (HVAC) system to control the HVAC system based on a comparison of a determined ambient temperature and the setpoint temperature. In some embodiments, the processing system is configured to operate in a plurality of operating states including a first operating state characterized by relatively low power consumption and a corresponding relatively low associated heat generation and a second operating state characterized by relatively high power consumption and a corresponding relatively high associated heat generation. The processing system may be further configured to, during time intervals in which the processing system is operating in the first operating state, process the temperature sensor measurements according to a first ambient temperature determination algorithm based on readings from said first and second temperature sensors to compute the determined ambient temperature. In some embodiments, the first ambient temperature determination algorithm will not use readings from the third temperature sensor. The processing system may be further configured to, during time intervals in which the processing system is operating in the second operating state, process the temperature sensor measurements according to a second ambient temperature determination algorithm based on readings from said third temperature sensor to compute the determined ambient temperature.

In another embodiment, a method of compensating for internal heating in a thermostat may include determining, using a processing system of the thermostat, a current operating state of the processing system. The thermostat may include a housing, a user interface, and one or more temperature sensors, each of the one or more temperature sensors being configured to provide temperature sensor measurements, where the one or more temperature sensors may include a first temperature sensor, a second temperature sensor, and a third temperature sensor, each being positioned at different locations relative to the housing. The thermostat may also include a processing system disposed within the housing, the processing system being configured to be in operative communication with the one or more temperature sensors to receive the temperature sensor measurements, in operative communication with one or more input devices including said user interface for determining a setpoint temperature, and in still further operative communication with a heating, ventilation, and air conditioning (HVAC) system to control the HVAC system based on a comparison of a determined ambient temperature and the setpoint temperature, where the processing system is configured to operate in a plurality of operating states including a first operating state characterized by relatively low power consumption and a corresponding relatively low associated heat generation and a second operating state characterized by relatively high power consumption and a corresponding relatively high associated heat generation. The method may also include, during time intervals in which the processing system is operating in the first operating state, processing the temperature sensor measurements according to a first ambient temperature determination algorithm based on readings from said first and second temperature sensors to compute the determined ambient temperature. The method may further include, during time intervals in which the processing system is operating in the second operating state, processing the temperature sensor measurements according to a second ambient temperature determination algorithm based on readings from said third temperature sensor to compute the determined ambient temperature. In some embodiments, the first ambient temperature determination algorithm will not use readings from the third temperature sensor.

In yet another embodiment, a thermostat may include one or more temperature sensors, each of the one or more temperature sensors being configured to provide temperature sensor measurements. The thermostat may also include a processing system, the processing system being configured to be in operative communication with the one or more temperature sensors to receive the temperature sensor measurements, and configured to be in operative communication with a heating, ventilation, and air conditioning (HVAC) system to control the HVAC system based on a comparison of a determined ambient temperature and a setpoint temperature. The processing system may be configured to operate in a plurality of operating states including a first operating state characterized by relatively low power consumption and a corresponding relatively low associated heat generation and a second operating state characterized by relatively high power consumption and a corresponding relatively high associated heat generation. The processing system may also be configured to, during time intervals in which the processing system is operating in the first operating state, process the temperature sensor measurements according to a first ambient temperature determination algorithm to compute the determined ambient temperature. The processing system may further be configured to, during time intervals in which the processing system is operating in the second operating state, process the temperature sensor measurements according to a second ambient temperature determination algorithm to compute the determined ambient temperature.

A further understanding of the nature and advantages of the present invention may be realized by reference to the remaining portions of the specification and the drawings. Also note that other embodiments may be described in the following disclosure and claims.

DETAILED DESCRIPTION OF THE INVENTION

Figure 1:
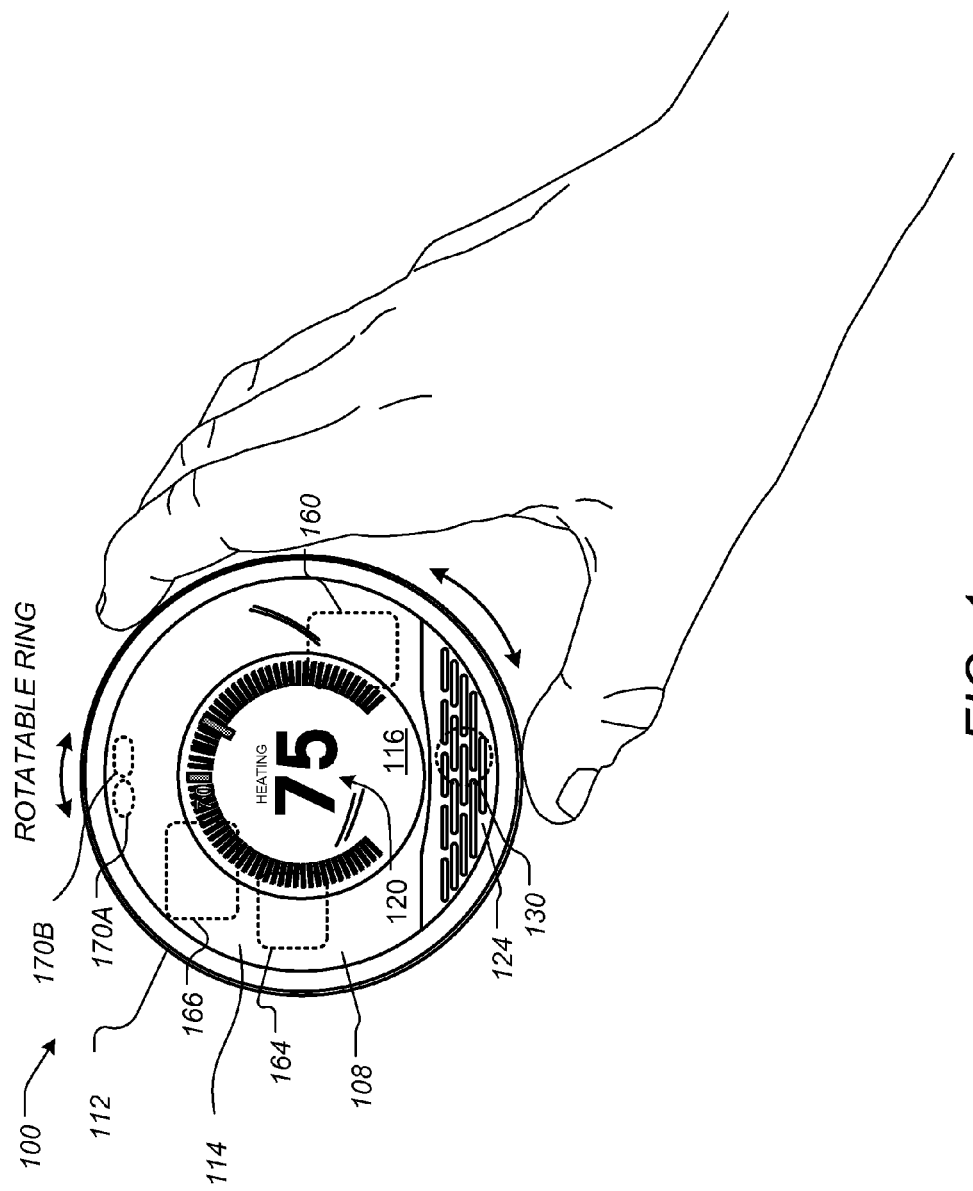
FIG. 1 illustrates a perspective view of a thermostat, according to one embodiment.

The subject matter of this patent specification relates to the subject matter of the following commonly assigned applications, each of which is incorporated by reference herein: U.S. Ser. No. 13/624,881 filed Sep. 21, 2012 (Ref. No. NES0233-US); U.S. Ser. No. 13/624,811 filed Sep. 21, 2012 (Ref. No. NES0232-US); International Application No. PCT/US12/00007 filed Jan. 3, 2012; U.S. Ser. No. 13/466,815 filed May 8, 2012 (Ref. No. NES0179-US); U.S. Ser. No. 13/467,025 (Ref. No. NES0177-US); U.S. Ser. No. 13/351,688 filed Jan. 17, 2012, which issued as U.S. Pat. No. 8,195,313 on Jun. 5, 2012 (Ref. No. NES0175-US); and U.S. Ser. No. 13/199,108 (Ref. No. NES0054-US). The above-referenced patent applications are collectively referenced herein as "the commonly-assigned incorporated applications."

In the following detailed description, for purposes of explanation, numerous specific details are set forth to provide a thorough understanding of the various embodiments of the present invention. Those of ordinary skill in the art will realize that these various embodiments of the present invention are illustrative only and are not intended to be limiting in any way. Other embodiments of the present invention will readily suggest themselves to such skilled persons having the benefit of this disclosure.

In addition, for clarity purposes, not all of the routine features of the embodiments described herein are shown or described. One of ordinary skill in the art would readily appreciate that in the development of any such actual embodiment, numerous embodiment-specific decisions may be required to achieve specific design objectives. These design objectives will vary from one embodiment to another and from one developer to another. Moreover, it will be appreciated that such a development effort might be complex and time-consuming but would nevertheless be a routine engineering undertaking for those of ordinary skill in the art having the benefit of this disclosure.

It is to be appreciated that while one or more embodiments are described further herein in the context of typical HVAC system used in a residential home, such as single-family residential home, the scope of the present teachings is not so limited. More generally, thermostats according to one or more of the preferred embodiments are applicable for a wide variety of enclosures having one or more HVAC systems including, without limitation, duplexes, townhomes, multi-unit apartment buildings, hotels, retail stores, office buildings, and industrial buildings. Further, it is to be appreciated that while the terms user, customer, installer, homeowner, occupant, guest, tenant, landlord, repair person, and/or the like may be used to refer to the person or persons who are interacting with the thermostat or other device or user interface in the context of one or more scenarios described herein, these references are by no means to be considered as limiting the scope of the present teachings with respect to the person or persons who are performing such actions.

Exemplary Thermostat Embodiments

Provided according to one or more embodiments are systems, methods, and computer program products for controlling one or more HVAC systems based on one or more versatile sensing and control units (VSCU units), each VSCU unit being configured and adapted to provide sophisticated, customized, energy-saving HVAC control functionality while at the same time being visually appealing, non-intimidating, and easy to use. The term "thermostat" is used herein below to represent a particular type of VSCU unit (Versatile Sensing and Control) that is particularly applicable for HVAC control in an enclosure. Although "thermostat" and "VSCU unit" may be seen as generally interchangeable for the contexts of HVAC control of an enclosure, it is within the scope of the present teachings for each of the embodiments herein to be applied to VSCU units having control functionality over measurable characteristics other than temperature (e.g., pressure, flow rate, height, position, velocity, acceleration, capacity, power, loudness, brightness) for any of a variety of different control systems involving the governance of one or more measurable characteristics of one or more physical systems, and/or the governance of other energy or resource consuming systems such as water usage systems, air usage systems, systems involving the usage of other natural resources, and systems involving the usage of various other forms of energy.

FIGS. 1-5 and the descriptions in relation thereto provide exemplary embodiments of thermostat hardware and/or software that can be used to implement the specific embodiments of the appended claims. This thermostat hardware and/or software is not meant to be limiting, and is presented to provide an enabling disclosure. FIG. 1 illustrates a perspective view of a thermostat 100, according to one embodiment. In this specific embodiment, the thermostat 100 can be controlled by at least two types of user input, the first being a rotation of the outer ring 112, and the second being an inward push on an outer cap 108 until an audible and/or tactile "click" occurs. As used herein, these two types of user inputs, may be referred to as "manipulating" the thermostat. In other embodiments, manipulating the thermostat may also include pressing keys on a keypad, voice recognition commands, and/or any other type of input that can be used to change or adjust settings on the thermostat 100.

For this embodiment, the outer cap 108 can comprise an assembly that includes the outer ring 112, a cover 114, an electronic display 116, and a metallic portion 124. Each of these elements, or the combination of these elements, may be referred to as a "housing" for the thermostat 100. Simultaneously, each of these elements, or the combination of these elements, may also form a user interface. The user interface may specifically include the electronic display 116. In FIG. 1, the user interface 116 may be said to operate in an active display mode. The active display mode may include providing a backlight for the electronic display 116. In other embodiments, the active display mode may increase the intensity and/or light output of the electronic display 116 such that a user can easily see displayed settings of the thermostat 100, such as a current temperature, a setpoint temperature, an HVAC function, and/or the like. The active display mode may be contrasted with an inactive display mode (not shown). The inactive display mode can disable a backlight, reduce the amount of information displayed, lessen the intensity of the display, and/or altogether turn off the electronic display 116, depending on the embodiment.

Depending on the settings of the thermostat 100, the active display mode and the inactive display mode of the electronic display 116 may also or instead be characterized by the relative power usage of each mode. In one embodiment, the active display mode may generally require substantially more electrical power than the inactive display mode. In some embodiments, different operating modes of the electronic display 116 may instead be characterized completely by their power usage. In these embodiments, the different operating modes of the electronic display 116 may be referred to as a first mode and a second mode, where the user interface requires more power when operating in the first mode than when operating in the second mode.

According to some embodiments the electronic display 116 may comprise a dot-matrix layout (individually addressable) such that arbitrary shapes can be generated, rather than being a segmented layout. According to some embodiments, a combination of dot-matrix layout and segmented layout is employed. According to some embodiments, electronic display 116 may be a backlit color liquid crystal display (LCD). An example of information displayed on the electronic display 116 is illustrated in FIG. 1, and includes central numerals 120 that are representative of a current setpoint temperature. According to some embodiments, metallic portion 124 can have a number of slot-like openings so as to facilitate the use of a sensors 130, such as a passive infrared motion sensor (PIR), mounted beneath the slot-like openings.

According to some embodiments, the thermostat 100 can include additional components, such as a processing system 160, display driver 164, and a wireless communications system 166. The processing system 160 can adapted or configured to cause the display driver 164 to cause the electronic display 116 to display information to the user. The processing system 160 can also be configured to receive user input via the rotatable ring 112. These additional components, including the processing system 160, can be enclosed within the housing, as displayed in FIG. 1. These additional components are described in further detail herein below.

The processing system 160, according to some embodiments, is capable of carrying out the governance of the thermostat's operation. For example, processing system 160 can be further programmed and/or configured to maintain and update a thermodynamic model for the enclosure in which the HVAC system is installed. According to some embodiments, the wireless communications system 166 can be used to communicate with devices such as personal computers, remote servers, handheld devices, smart phones, and/or other thermostats or HVAC system components. These communications can be peer-to-peer communications, communications through one or more servers located on a private network, or and/or communications through a cloud-based service.

Motion sensing as well as other techniques can be use used in the detection and/or prediction of occupancy. According to some embodiments, occupancy information can be a used in generating an effective and efficient scheduled program. For example, an active proximity sensor 170A can be provided to detect an approaching user by infrared light reflection, and an ambient light sensor 170B can be provided to sense visible light. The proximity sensor 170A can be used in conjunction with a plurality of other sensors to detect proximity in the range of about one meter so that the thermostat 100 can initiate "waking up" when the user is approaching the thermostat and prior to the user touching the thermostat. Such use of proximity sensing is useful for enhancing the user experience by being "ready" for interaction as soon as, or very soon after the user is ready to interact with the thermostat. Further, the wake-up-on-proximity functionality also allows for energy savings within the thermostat by "sleeping" when no user interaction is taking place or about to take place. The various types of sensors that may be used, as well as the operation of the "wake up" function are described in much greater detail throughout the remainder of this disclosure.

Figure 2:
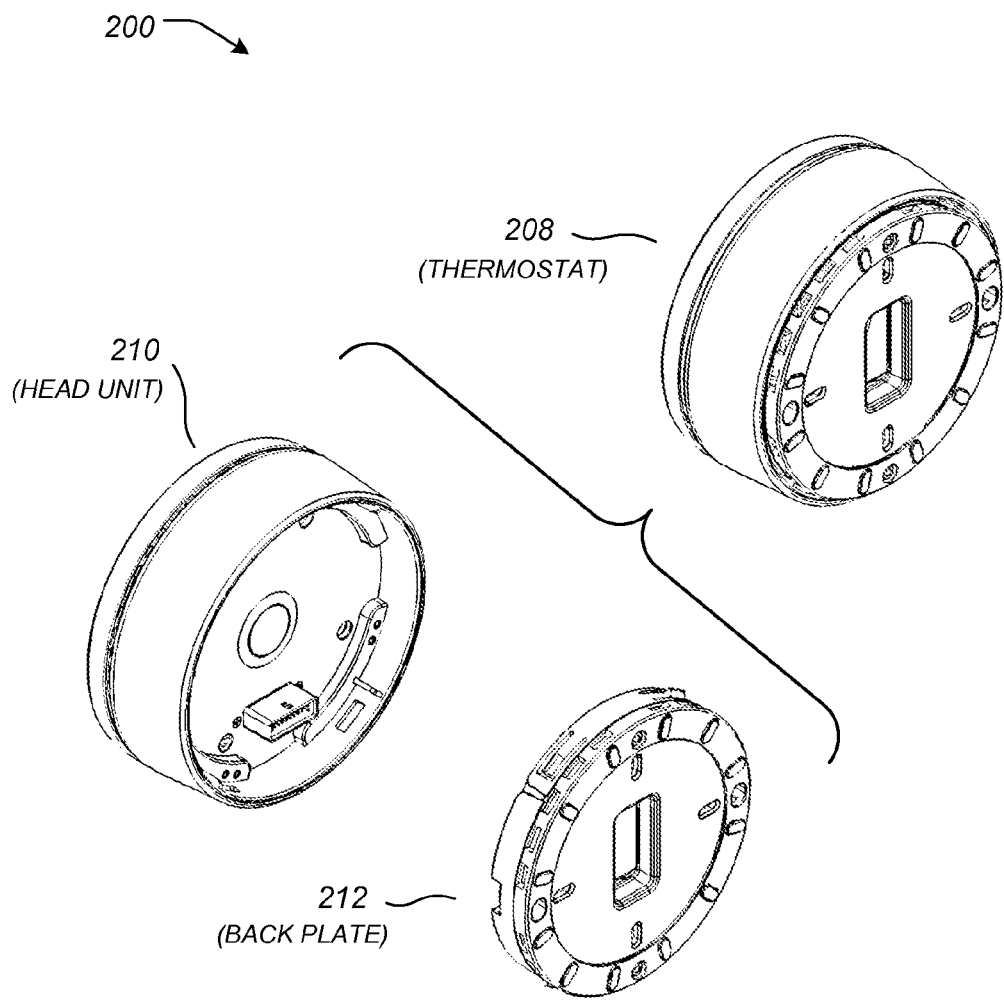
FIG. 2 illustrates an exploded perspective view of a thermostat having a head unit and the backplate, according to one embodiment.

In some embodiments, the thermostat can be physically and/or functionally divided into at least two different units. Throughout this disclosure, these two units can be referred to as a head unit and a backplate. FIG. 2 illustrates an exploded perspective view 200 of a thermostat 208 having a head unit 210 and a backplate 212, according to one embodiment. Physically, this arrangement may be advantageous during an installation process. In this embodiment, the backplate 212 can first be attached to a wall, and the HVAC wires can be attached to a plurality of HVAC connectors on the backplate 212. Next, the head unit 210 can be connected to the backplate 212 in order to complete the installation of the thermostat 208.

Figure 3A:
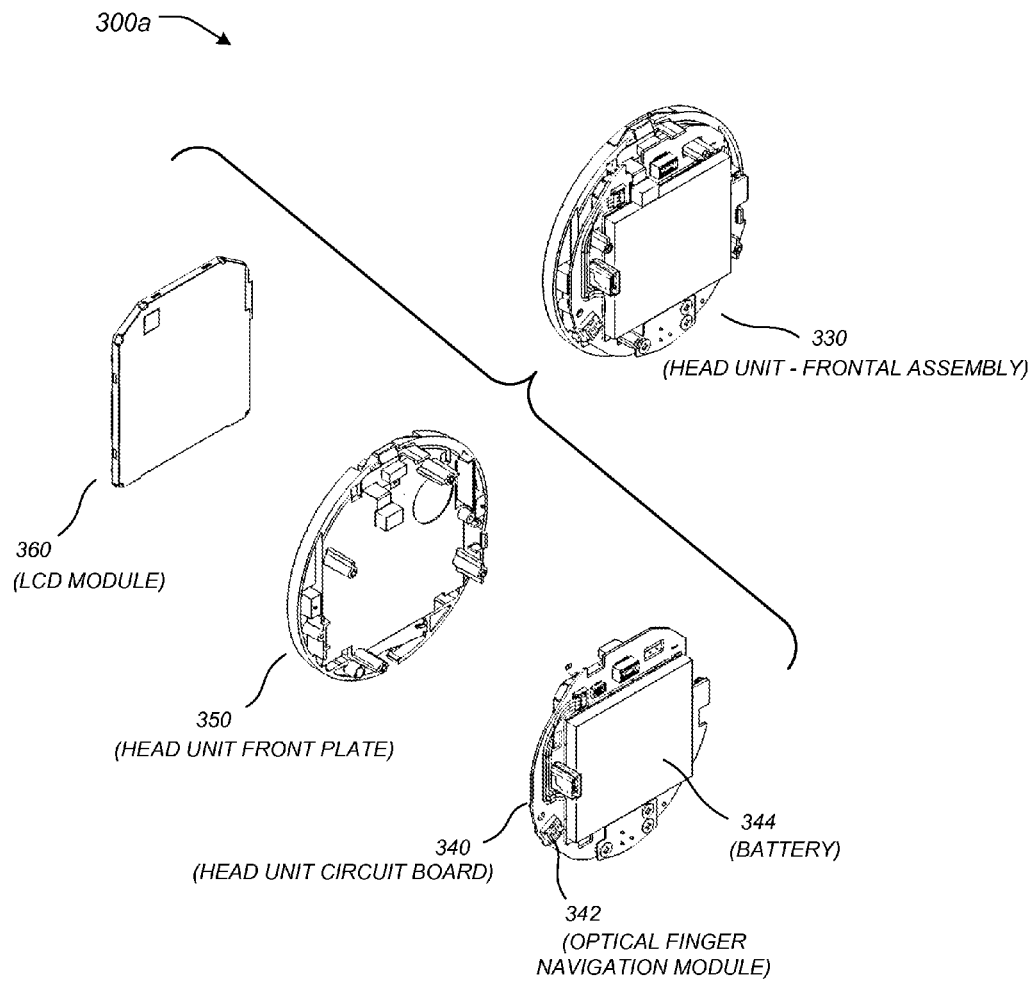
FIG. 3A illustrates an exploded perspective view of a head unit with respect to its primary components, according to one embodiment.

FIG. 3A illustrates an exploded perspective view 300a of a head unit 330 with respect to its primary components, according to one embodiment. Here, the head unit 330 may include an electronic display 360. According to this embodiment, the electronic display 360 may comprise an LCD module. Furthermore, the head unit 330 may include a mounting assembly 350 used to secure the primary components in a completely assembled head unit 330. The head unit 330 may further include a circuit board 340 that can be used to integrate various electronic components described further below. In this particular embodiment, the circuit board 340 of the head unit 330 can include a manipulation sensor 342 to detect user manipulations of the thermostat. In embodiments using a rotatable ring, the manipulation sensor 342 may comprise an optical finger navigation module as illustrated in FIG. 3A. A rechargeable battery 344 may also be included in the assembly of the head unit 330. In one preferred embodiment, rechargeable battery 344 can be a Lithium-Ion battery, which may have a nominal voltage of 3.7 volts and a nominal capacity of 560 mAh.

Figure 3B:
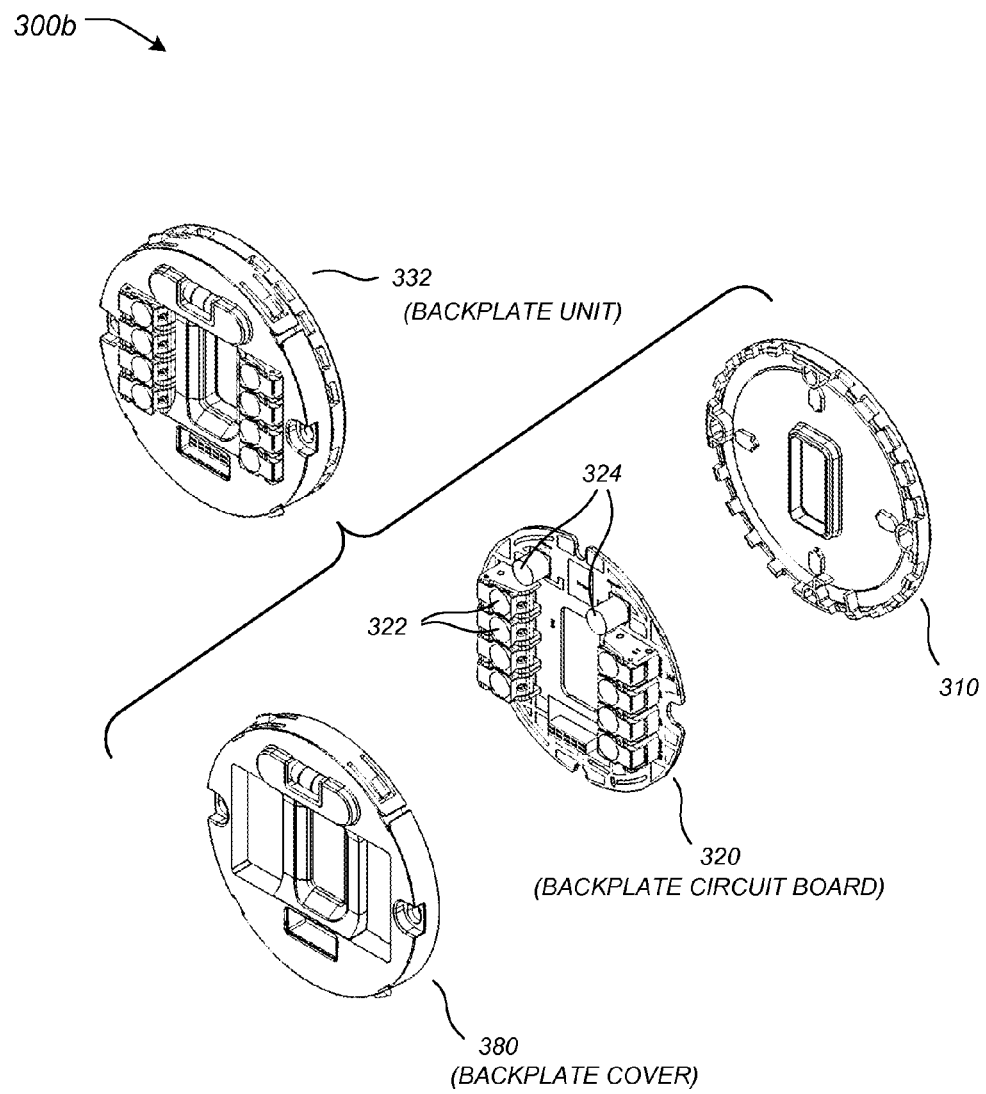
FIG. 3B illustrates an exploded perspective view of a backplate with respect to its primary components, according to one embodiment.

FIG. 3B illustrates an exploded perspective view 300b of a backplate 332 with respect to its primary components, according to one embodiment. The backplate 332 may include a frame 310 that can be used to mount, protect, or house a backplate circuit board 320. The backplate circuit board 320 may be used to mount electronic components, including one or more processing functions, and/or one or more HVAC wire connectors 322. The one or more HVAC wire connectors 322 may include integrated wire insertion sensing circuitry configured to determine whether or not a wire is mechanically and/or electrically connected to each of the one or more HVAC wire connectors 322. In this particular embodiment, two relatively large capacitors 324 are a part of power stealing circuitry that can be mounted to the backplate circuit board 320. The power stealing circuitry is discussed further herein below.

Figure 4A:
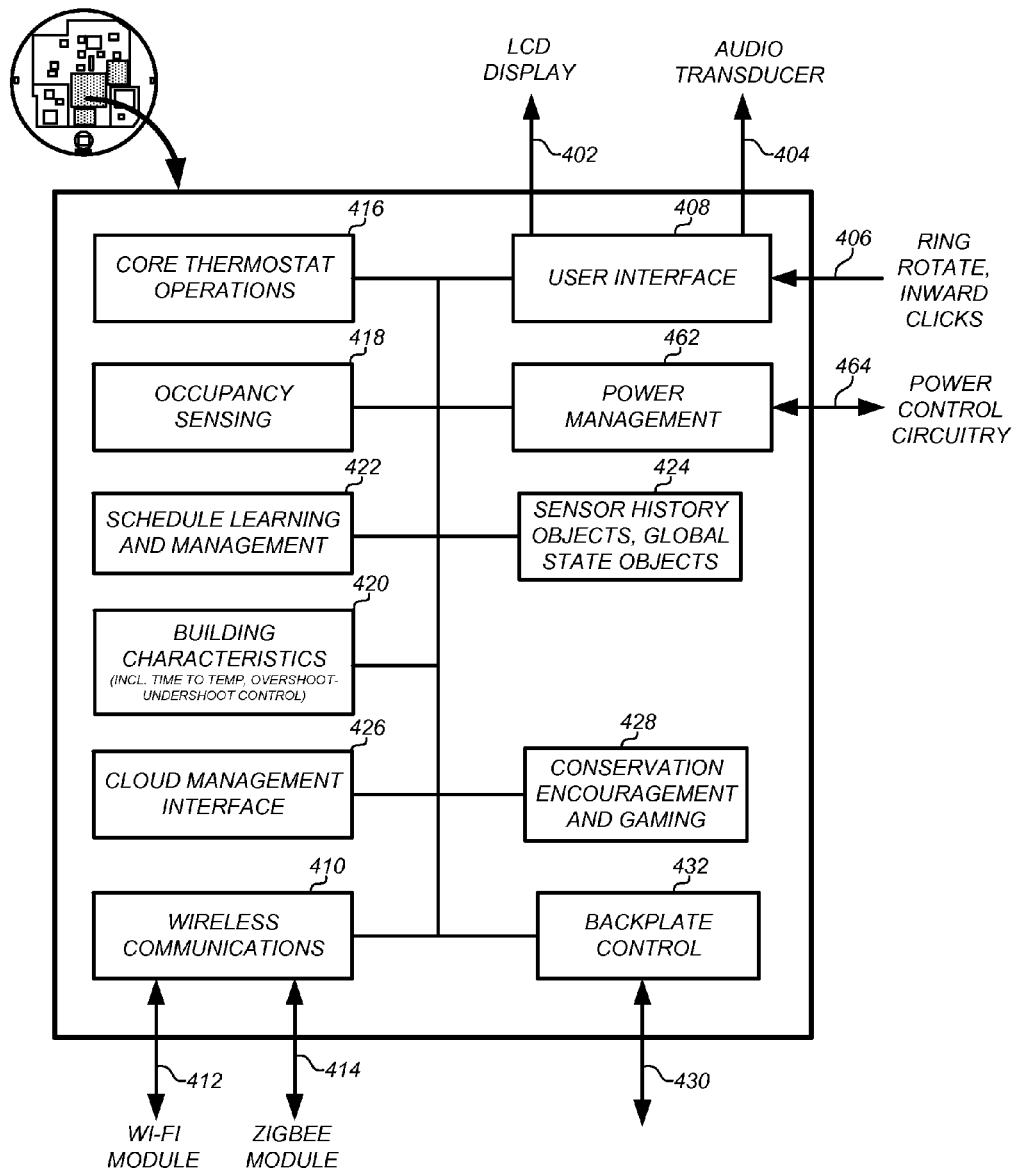
FIG. 4A illustrates a simplified functional block diagram for a head unit, according to one embodiment.

In addition to physical divisions within the thermostat that simplify installation process, the thermostat may also be divided functionally between the head unit and the backplate. FIG. 4A illustrates a simplified functional block diagram 400a for a head unit, according to one embodiment. The functions embodied by block diagram 400a are largely self-explanatory, and may be implemented using one or more processing functions. As used herein, the term "processing function" may refer to any combination of hardware and/or software. For example, a processing function may include a microprocessor, a microcontroller, distributed processors, a lookup table, digital logic, logical/arithmetic functions implemented in analog circuitry, and/or the like. A processing function may also be referred to as a processing system, a processing circuit, or simply a circuit.

In this embodiment, a processing function on the head unit may be implemented by an ARM processor. The head unit processing function may interface with the electronic display 402, an audio system 404, and a manipulation sensor 406 as a part of a user interface 408. The head unit processing function may also facilitate wireless communications 410 by interfacing with various wireless modules, such as a Wi-Fi module 412 and/or a ZigBee module 414. Furthermore, the head unit processing function may be configured to control the core thermostat operations 416, such as operating the HVAC system. The head unit processing function may further be configured to determine or sense occupancy 418 of a physical location, and to determine building characteristics 420 that can be used to determine time-to-temperature characteristics. Using the occupancy sensing 418, the processing function on the head unit may also be configured to learn and manage operational schedules 422, such as diurnal heat and cooling schedules. A power management module 462 may be used to interface with a corresponding power management module on the back plate, the rechargeable battery, and a power control circuit 464 on the back plate.

Additionally, the head unit processing function may include and/or be communicatively coupled to one or more memories. The one or more memories may include one or more sets of instructions that cause the processing function to operate as described above. The one or more memories may also include a sensor history and global state objects 424. The one or more memories may be integrated with the processing function, such as a flash memory or RAM memory available on many commercial microprocessors. The head unit processing function may also be configured to interface with a cloud management system 426, and may also operate to conserve energy wherever appropriate 428. An interface 432 to a backplate processing function 430 may also be included, and may be implemented using a hardware connector.

Figure 4B:
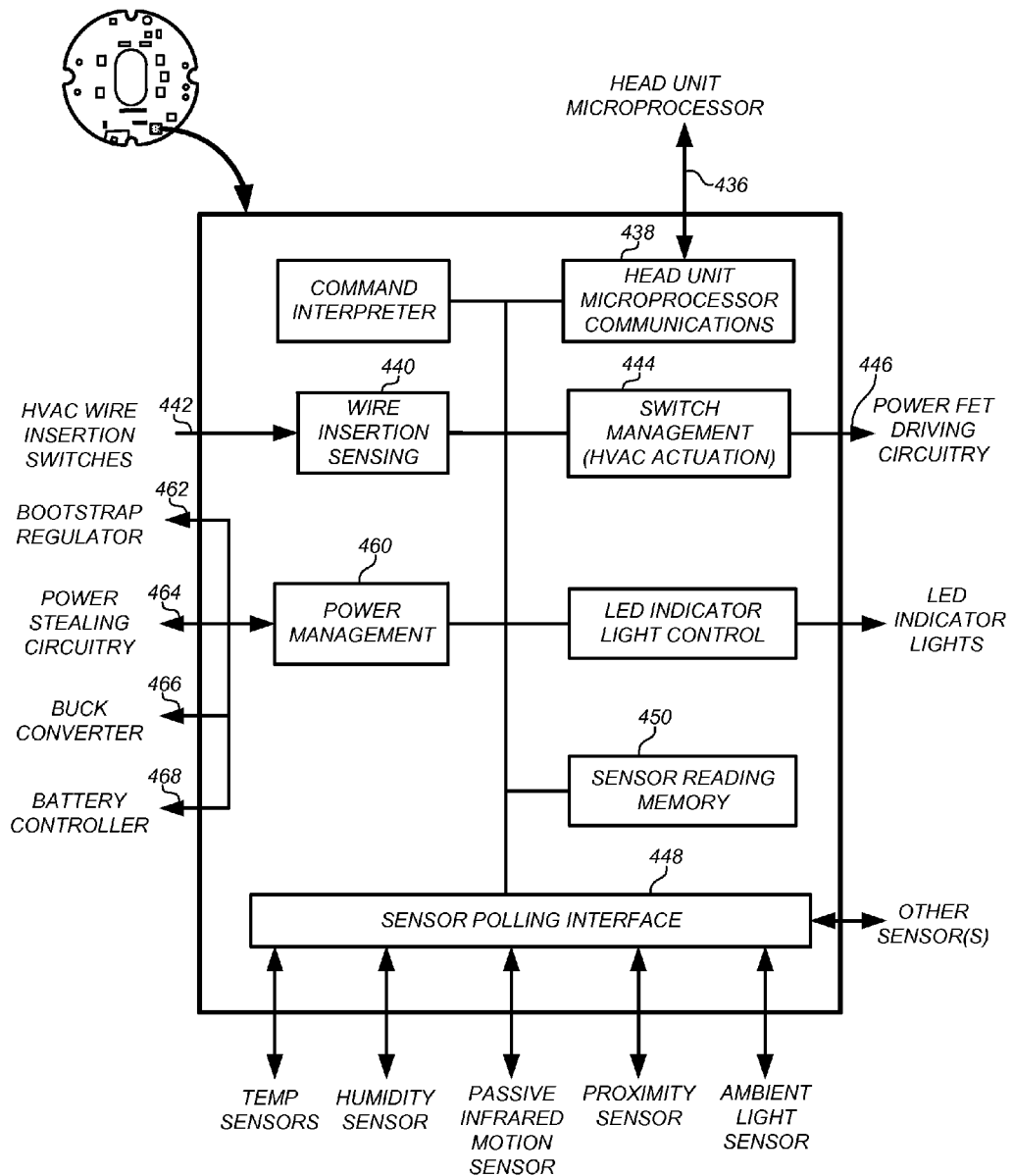
FIG. 4B illustrates a simplified functional block diagram for a backplate, according to one embodiment.

FIG. 4B illustrates a simplified functional block diagram for a backplate, according to one embodiment. Using an interface 436 that is matched to the interface 432 shown in FIG. 4A, the backplate processing function can communicate with the head unit processing function 438. The backplate processing function can include wire insertion sensing 440 that is coupled to external circuitry 442 configured to provide signals based on different wire connection states. The backplate processing function may be configured to manage the HVAC switch actuation 444 by driving power FET circuitry 446 to control the HVAC system.

The backplate processing function may also include a sensor polling interface 448 to interface with a plurality of sensors. In this particular embodiment, the plurality of sensors may include a temperature sensor, a humidity sensor, a PIR sensor, a proximity sensor, an ambient light sensor, and or other sensors not specifically listed. This list is not meant to be exhaustive. Other types of sensors may be used depending on the particular embodiment and application, such as sound sensors, flame sensors, smoke detectors, and/or the like. The sensor polling interface 448 may be communicatively coupled to a sensor reading memory 450. The sensor reading memory 450 can store sensor readings and may be located internally or externally to a microcontroller or microprocessor.

Finally, the backplate processing function can include a power management unit 460 that is used to control various digital and/or analog components integrated with the backplate and used to manage the power system of the thermostat. Although one having skill in the art will recognize many different implementations of a power management system, the power management system of this particular embodiment can include a bootstrap regulator 462, a power stealing circuit 464, a buck converter 466, and/or a battery controller 468.

Figure 5:
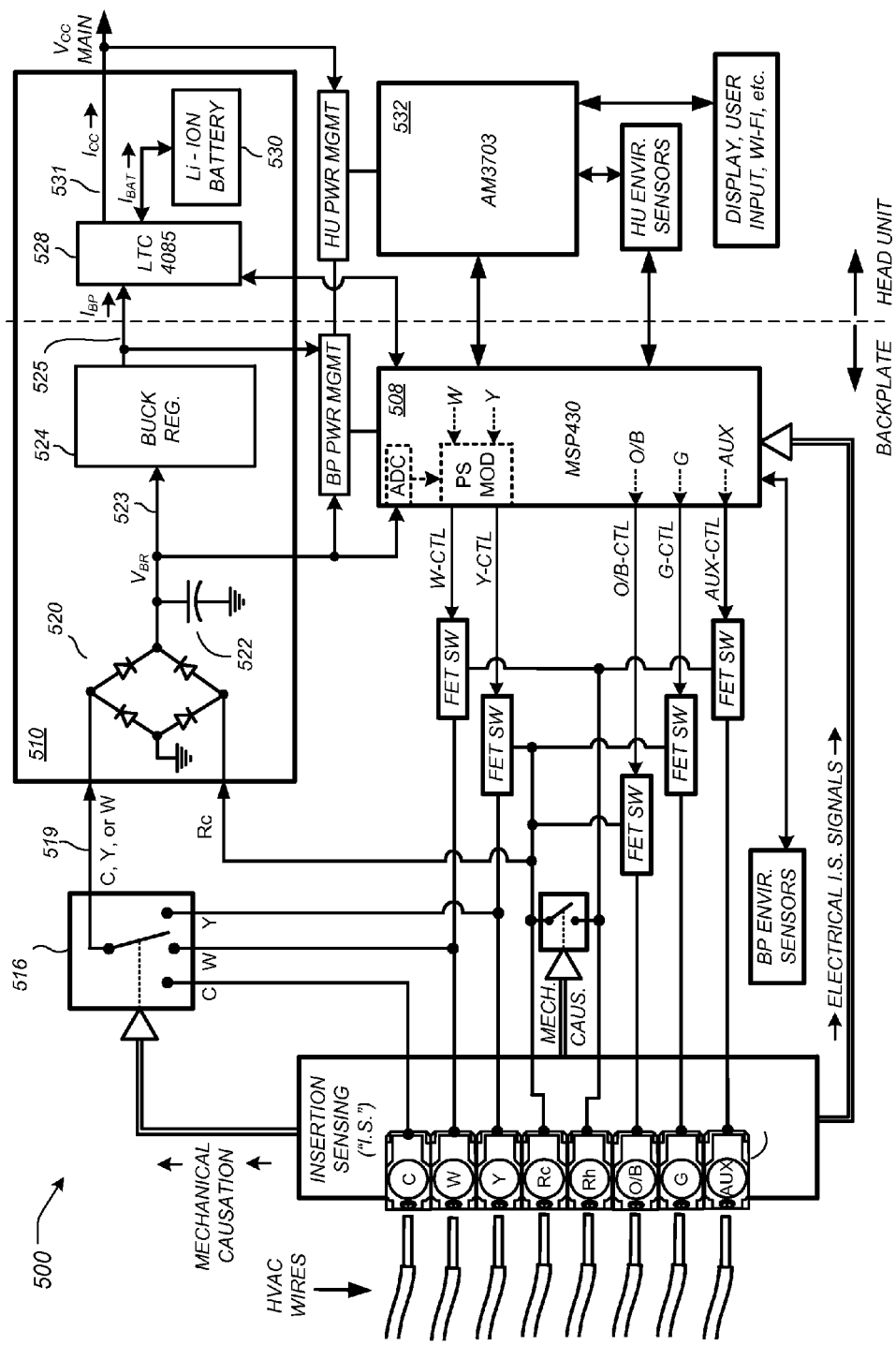
FIG. 5 illustrates a simplified circuit diagram of a system for managing the power consumed by a thermostat, according to one embodiment.

FIG. 5 illustrates a simplified circuit diagram 500 of a system for managing the power consumed by a thermostat, according to one embodiment. The powering circuitry 510 comprises a full-wave bridge rectifier 520, a storage and waveform-smoothing bridge output capacitor 522 (which can be, for example, on the order of 30 microfarads), a buck regulator circuit 524, a power-and-battery (PAB) regulation circuit 528, and a rechargeable lithium-ion battery 530. In conjunction with other control circuitry including backplate power management circuitry 527, head unit power management circuitry 529, and the microcontroller 508, the powering circuitry 510 can be configured and adapted to have the characteristics and functionality described herein below.

By virtue of the configuration illustrated in FIG. 5, when there is a "C" wire presented upon installation, the powering circuitry 510 operates as a relatively high-powered, rechargeable-battery-assisted AC-to-DC converting power supply. When there is not a "C" wire presented, the powering circuitry 510 operates as a power-stealing, rechargeable-battery-assisted AC-to-DC converting power supply. The powering circuitry 510 generally serves to provide the voltage Vcc MAIN that is used by the various electrical components of the thermostat, which in one embodiment can be about 4.0 volts. For the case in which the "C" wire is present, there is no need to worry about accidentally tripping (as there is in inactive power stealing) or untripping (for active power stealing) an HVAC call relay, and therefore relatively large amounts of power can be assumed to be available. Generally, the power supplied by the "C" wire will be greater than the instantaneous power required at any time by the remaining circuits in the thermostat.

However, a "C" wire will typically only be present in about 20% of homes. Therefore, the powering circuitry 510 may also be configured to "steal" power from one of the other HVAC wires in the absence of a "C" wire. As used herein, "inactive power stealing" refers to the power stealing that is performed during periods in which there is no active call in place based on the lead from which power is being stolen. Thus, for cases where it is the "Y" lead from which power is stolen, "inactive power stealing" refers to the power stealing that is performed when there is no active cooling call in place. As used herein, "active power stealing" refers to the power stealing that is performed during periods in which there is an active call in place based on the lead from which power is being stolen. Thus, for cases where it is the "Y" lead from which power is stolen, "active power stealing" refers to the power stealing that is performed when there is an active cooling call in place. During inactive or active power stealing, power can be stolen from a selected one of the available call relay wires. While a complete description of the power stealing circuitry 510 can be found in the commonly assigned applications that have been previously incorporated herein by reference, the following brief explanation is sufficient for purposes of this disclosure.

Some components in the thermostat, such as the head unit processing function, the user interface, and/or the electronic display may consume more instantaneous power than can be provided by power stealing alone. When these more power-hungry components are actively operating, the power supplied by power stealing can be supplemented with the rechargeable battery 530. In other words, when the thermostat is engaged in operations, such as when the electronic display is in an active display mode, power may be supplied by both power stealing and the rechargeable battery 530. In order to preserve the power stored in the rechargeable battery 530, and to give the rechargeable battery 530 an opportunity to recharge, some embodiments optimize the amount of time that the head unit processing function and the electronic display are operating in an active mode. In other words, it may be advantageous in some embodiments to keep the head unit processing function in a sleep mode or low power mode and to keep the electronic display in an inactive display mode as long as possible without affecting the user experience.

When the head unit processing function and the electronic display are in an inactive or sleep mode, the power consumed by the thermostat is generally less than the power provided by power stealing. Therefore, the power that is not consumed by the thermostat can be used to recharge the rechargeable battery 530. In this embodiment, the backplate processing function 508 (MSP430) can be configured to monitor the environmental sensors in a low-power mode, and then wake the head unit processing function 532 (AM3703) when needed to control the HVAC system, etc. Similarly, the backplate processing function 508 can be used to monitor sensors used to detect the closeness of a user, and wake the head unit processing system 532 and/or the electronic display when it is determined that a user intends to interface with the thermostat.

It will be understood by one having skill in the art that the various thermostat embodiments depicted and described in relation to FIGS. 1-5 are merely exemplary and not meant to be limiting. Many other hardware and/or software configurations may be used to implement a thermostat and the various functions described herein below, including those described in described in U.S. Ser. No. 13/624,881 (Ref. No. NES0233-US), supra, and U.S. Ser. No. 13/624,811 (Ref. No.

NES0232-US), supra. These embodiments should be seen as an exemplary platform in which the following embodiments can be implemented to provide an enabling disclosure. Of course, the following methods, systems, and/or software program products could also be implemented using different types of thermostats, different hardware, and/or different software.

Self-Heating Correction Configurations

One issue that can arise in relation to the thermostatic control of an HVAC system for many homes and businesses (hereinafter "enclosures") relates to scenarios in which temperature sensors used to calculate a determined ambient temperature may be heated by internal electronic components of the thermostat to a point where an algorithm for determining the ambient temperature during low-power operation is no longer accurate.

Modern smart thermostats may include electronic components such as microprocessors and electronic displays that may generate heat during use. Oftentimes, one or more temperature sensors used by the thermostat may be located in close proximity to the internal heat-generating components. Furthermore, a thermostat housing, along with other mechanical thermostat components, may create an insulating effect on internal temperature sensors. These factors may combine to distort raw temperature sensor measurements such that these raw temperature sensor measurements do not represent an accurate representation of the ambient temperature within an enclosure.

When subject to the internal heating described above, it can often happen that the internals of the thermostat body heat up, along with possibly the ambient temperature in the vicinity of the thermostat. This may cause the thermostat to perceive a sensed ambient temperature for the air in the enclosure that is significantly lower than the actual ambient air temperature in the enclosure according to equations to be discussed below. Because the thermostat "thinks" that the enclosure temperature is lower than it really is, the thermostat controls the HVAC system to make or allow the enclosure to become hotter than it would otherwise become. This can cause occupant discomfort in the summertime due to insufficient cooling, and furthermore can cause both occupant discomfort and wasted energy in the wintertime due to excessive heating. Even an artificial temperature increase of a few degrees may be sufficient to activate an HVAC heating system every time a user interacts with the thermostat and turns on the user interface.

Many modern smart thermostats use an ambient temperature determination algorithm that compensates for heat generated by internal electronic components of the thermostat. Generally, these algorithms estimate an ambient temperature that is lower than the measured temperature of one or more internal temperature sensors. These ambient temperature determination algorithms are configured to compensate for a near-constant level of internal heating. For example, a thermostat may include a low-power processor and a basic electronic display that are always active, and therefore generate a near-constant level of heat that is absorbed by the thermostat.

However, some modern smart thermostats, such as the exemplary embodiment described in the preceding section, may include high-power processors, state-switching transistors, and/or advanced electronic displays. As described above, these higher power electronics may be operated in a plurality of different operating states. The first operating state may be associated with a relatively low level of power consumption, along with a corresponding relatively low level of internal heat generation. A second operating state may be associated with a relatively high level of power consumption, along with a corresponding relatively high level of internal heat generation.

A thermostat may compensate to some degree for internal heating by determining an ambient temperature based on temperature measurements provided by a first temperature sensor and a second temperature sensor. Typically, the second temperature sensor may be located closer to the heat-generating components than the first temperature sensor, such as on the head unit circuit board. The first temperature sensor may be located further away from the heat-generating components, such as on an inside surface of the housing of the thermostat. However, it has been discovered that when the internal electronics operate in the relatively high power state, the second temperature sensor will heat up faster than the first temperature sensor, causing the determined ambient temperature to artificially drop according to equations discussed in further detail below.

Embodiments described herein may solve this problem by including a third temperature sensor. In some embodiments, the third temperature sensor may be located such that it is not as susceptible to internal heating as either the first or second temperature sensors. For example, the third temperature sensor may be located towards the bottom of the backplate of the exemplary thermostat described above. Because of its location, the backplate temperature sensor may be less susceptible to internal heating and generally tracks the ambient enclosure temperature according to an arithmetic offset.

In some embodiments, the thermostat may generally detect time intervals where excess self-heating may occur, and in response the thermostat can switch between temperature sensors and/or equations that are used to calculate the determined ambient temperature. During intervals when excessive internal heating is not detected, the determined ambient temperature can be calculated as a function of the head unit (second) temperature sensor and the housing (first) temperature sensor. During intervals when excess internal heating is detected, the determined ambient temperature can be calculated as a function of the backplate (third) temperature sensor and an offset calculated by historical data.

In order to reduce false positives and false negatives, a state machine may first detect time intervals where the thermostat components are operating in a relatively high-power state. At this point, the state machine may then begin watching for a temperature divergence, i.e. a drop in the determined ambient temperature that diverges from the temperature measurements provided by the third temperature sensor by more than a threshold amount over a predetermined time period. When a temperature divergence coincides with the thermostat components operating in the relatively high-power state, the thermostat may switch between ambient temperature determination algorithms.

In some embodiments, internal heating compensation methods may be combined with external heating compensation methods that compensate for exposure to direct sunlight. The state machines for these two methods may be combined in order to provide a single set of wake-up conditions for the backplate processor.

The concepts described in this patent application may be broadly applied to any circumstance where intermittent environmental anomalies or operational states give reason to distrust techniques used to monitor environmental sensors during normal operation. Specifically, the idea of using secondary sensor readings combined with known system operating modes may be used to determine when a primary sensor is no longer reliable. When the unreliability of a primary sensor is detected, thresholds can be adjusted or alternate algorithms can be employed to compensate for the environmental anomalies causing the distorted readings by the primary sensor.

In addition to heating generated by internal electronics, the thermostat may also be heated by external stimuli. In one case, the user may interact with a thermostat for extended time interval. For example, during an initial set up or during menu operations, a user may use their hand to interact with the user interface of the thermostat, such as a rotatable ring. These types of user interfaces may necessitate near-constant user contact with thermostat housing. Therefore, heat from the user's hand may be transferred to the thermostat, and may in turn irregularly heat one or more of the temperature sensors. The algorithms described herein may also be altered to detect interactions with the user interface that would be sufficient to cause irregular temperature measurements, particularly in the first temperature sensor as described below.

Other applications might include a smoke detector that senses water vapor when dinner is being cooked, when someone is in the shower, or when other environmental conditions occur where the smoke sensor may detect a false positive. Home security systems could adjust monitoring conditions or sensor thresholds automatically when users interact with the system. Temperature sensors in a refrigerator could be calibrated to compensate for instances when separation switches detect users opening the refrigerator door. Additionally, many home electronic systems, such as TVs, stereos, receivers, and video players, may generate significant internal heat during certain types of operations. This excess heat may not only affect temperature sensors, but also other sensors that are sensitive to rapid temperature increases. By determining when high-power operating states occur, determinations based on internal sensor readings may be altered accordingly. On a broader scale, a central monitoring station can detect environmental anomalies, such as earthquakes, forest fires, and other atmospheric disturbances that may cause environmental monitoring systems inside of a home to malfunction. For example, nearby forest fires may set off home smoke detectors when a home's windows are open. The central monitoring station could transmit this information to each home sensing device and adjust thresholds or algorithms accordingly. Conversely, wide-scale sensor responses could be transmitted to a central monitoring station to detect environmental anomalies. For example, many smoke detectors going off in the same area may indicate a nearby forest fire.

Figure 6:
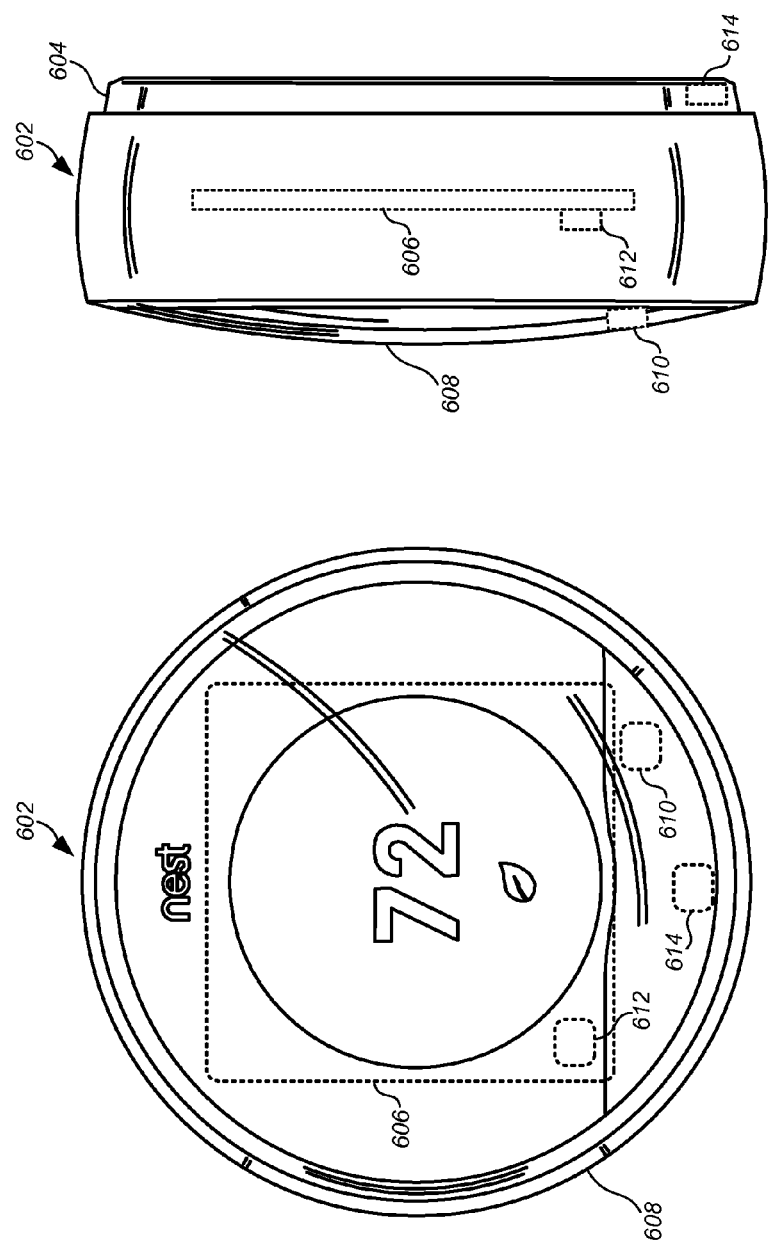
FIG. 6 illustrates various views of a thermostat having one or more temperature sensors, according to some embodiments.

FIG. 6 illustrates various views of a thermostat having one or more temperature sensors, according to some embodiments. Note that the embodiment of FIG. 6 is merely exemplary. Other embodiments may include more or fewer temperature sensors, and the temperature sensors may be disposed in different locations and/or orientations within the housing of the thermostat. For some embodiments, one or more of the features described herein are advantageously applied to one or more of the spatially compact, visually pleasing thermostat devices described in U.S. Ser. No. 13/624,881 (Ref. No. NES0233-US), supra, and U.S. Ser. No. 13/624,811 (Ref. No. NES0232-US), supra. Referring now again to FIG. 6, for this particular embodiment there is included three distinct temperature sensors. A first temperature sensor 610 may be disposed near a housing 608 of the thermostat 602. In one embodiment, the first temperature sensor 610 may be affixed to an internal portion of the housing 608. In some embodiments, the first temperature sensor 610 may be disposed within the housing 608 such that it is near a front portion of the thermostat 602, near a user interface of the thermostat 602, and/or relatively farther away from internal heat sources of the thermostat 602, such as a processing system, microprocessors, high-power sensors, power transistors, and/or the like.

The positioning of the first temperature sensor 610 may be described relative to a second temperature sensor 612. In some embodiments, the second temperature sensor 612 may be disposed on a circuit board internal to the thermostat 602. In the exemplary thermostat described above, a circuit board 606 in a head unit may be a suitable location to mount the second temperature sensor 612. The second temperature sensor 612 may also be referred to as a head unit temperature sensor. The first temperature sensor 610 may be disposed closer to the housing 608 of the thermostat 602 than the second temperature sensor 612. The second temperature sensor 612 may be disposed closer to the internal electronics of the thermostat 602 than the first temperature sensor 610.

The first temperature sensor 610 and the second temperature sensor 612 may also be characterized by how they are affected by internal temperature changes. The first temperature sensor 610 may respond more quickly to ambient temperature changes in the enclosure than the second temperature sensor 612. The second temperature sensor 612 may respond more quickly to heating caused by internal electronic components of the thermostat 602 than the first temperature sensor 610. In some cases, the first temperature sensor 610 may be described as being more linked to the external housing and the environment of the enclosure, while the second temperature sensor 612 may be described as being less linked to the external housing, but more linked to the internal heat-generating components of the thermostat.

Generally, the thermostat 602 does not simply accept raw temperature measurements provided by the one or more temperature sensors as an accurate representation of the ambient temperature in the enclosure. In some cases, the one or more temperature sensors may be disposed within the housing 608 of the thermostat 602, and may therefore be somewhat thermally insulated from the ambient temperature in the enclosure as described above. The one or more temperature sensors may also be affected by heat generated by internal electronic components of the thermostat 602. Microprocessors, microcontrollers, power sources, power regulating circuitry, power stealing circuitry, wireless communications circuitry, and user interface circuitry may all generate varying amounts of heat during operation of the thermostat 602. Because each of the one or more thermostats may be disposed at varying distances from the heat-generating components, the raw temperature sensor measurements may generally be higher than the actual ambient temperature of the enclosure.

Therefore, instead of using temperature sensor measurements provided by the one or more temperature sensors, the thermostat 602 may instead calculate a determined ambient temperature. As used herein, the term "determined ambient temperature" may refer to a temperature that determined by a processing system of the thermostat 602 as a function of the raw temperature sensor measurements provided by the one or more temperature sensors. Merely by way of example, the determined ambient temperature may be calculated by comparing the measurements from the first temperature sensor 610 to the measurements from the second temperature sensor 612, or by adding an offset to measurements from one of the one or more temperature sensors.

During time intervals in which it is determined that the thermostat 602 is operating in a relatively low power state, a first ambient temperature determination algorithm may be used to compute the determined ambient temperature. This first ambient temperature determination algorithm may leverage the fact that the first temperature sensor 610 and the second temperature sensor 612 may be affected differently by the heat-generating components of the thermostat 602. In one embodiment, the first ambient temperature determination algorithm may calculate the determined ambient temperature using the following equation.

$$T_{det}=T_1 k \cdot (T_2-T_1) \quad (1)$$

In equation (1), $T_{det}$ represents the determined ambient temperature, $T_1$ represents the temperature sensor measurements provided by the first temperature sensor 610, $T_2$ represents the temperature sensor measurements provided by the second temperature sensor 612, and k represents a constant that may depend on the characteristics of the thermostat 602 and/or the enclosure. In one embodiment, the value of k may be approximately 1.0.

The equation and method described above may be used to calculate the determined ambient temperature using at least two temperature sensors. Other embodiments may alter equation (1) to include additional temperature sensors. Generally, equation (1) may provide an accurate estimation of the ambient temperature of the enclosure during normal operation. However, situations have been discovered where this first ambient temperature determination algorithm is not adequate. One such situation involves times when the thermostat is operating in a relatively high-power state.

As used herein, the "relatively high-power state," or simply "high-power state," may characterize times when a main processor of the thermostat processing system operates in a wake state as opposed to in a sleep state. The relatively high-power state may also characterize times when a user interface is active as opposed to times when the user interface is inactive. The relatively high-power state may also characterize times when excessive heat may be generated using power stealing circuitry, power switching transistors, battery charging circuitry, and/or the like. The relatively high-power state may occur in response to a single electronic component generating excessive heat, or may occur in response to a combination of electronic components generating excessive heat. For example, the thermostat may operate in the high-power state when a user interacts with the user interface, and/or when a main processor transitions to an awake state to perform periodic calculations.

The heat generated by the internal electronics may be readily transferred to the second temperature sensor 612 by heating the circuit board 606 or by heating the internal environment of the thermostat 602. When the thermostat operates in the high-power state, the second temperature sensor 612 may be heated much faster than the first temperature sensor 610. This may cause the determined ambient temperature calculated by equation (1) to be lower than the actual ambient temperature. Because equation (1) is configured to calculate a determined ambient temperature based on a constant level of internal heating, these periodic spikes of excessive internal heating can corrupt these calculations.

When exposed to excessive internal heating, the second temperature sensor 612 tends to heat before the excessive internal heating begins to affect the first temperature sensor 610. Additionally, the second temperature sensor 612 will tend to heat at a faster rate than the first temperature sensor 610. In other words, the slope of the temperature measurements provided over time by the second temperature sensor 612 will be steeper than the temperature measurements provided over time by the first temperature sensor 610 when the thermostat is operating in the high-power state. According to equation (1) the determined ambient temperature is a function of the difference between the first temperature sensor 610 and the second temperature sensor 612. As this difference is artificially increased by excessive internal heating, the determined ambient temperature may drop at an even faster rate than that of the second temperature sensor 612.

To overcome the problem of excessive internal heating, some embodiments described herein may incorporate a third temperature sensor 614 into the design of the thermostat 602. The third temperature sensor 614 may be added to a portion of the thermostat 602 that is somewhat thermally isolated from the influence of internal heating compared to the other sensors. In this particular embodiment, the third temperature sensor 614 may be added to the backplate 604 of the thermostat 602. The third temperature sensor 614 may be disposed towards the bottom of the backplate 604, as it has been determined that internally generated heat rises away from the bottom of the thermostat 602. In some embodiments, insulating materials may also be incorporated into or around the third temperature sensor 614 in order to make the third temperature sensor 614 respond the slowest to internal heating effects out of the three temperature sensors.

Although the terms backplate and head unit are used to refer to different sections of the exemplary thermostat 602, this description may be generalized to cover any thermostat that comprises two modular sections. For example, a first modular section may include the third temperature sensor 614 and may be physically secured to a mounting surface within the enclosure while remaining physically separate from a second modular section of the thermostat 602. The second modular section may include the first temperature sensor 610 and the second temperature sensor 612, and may be secured to the first modular section after the first modular section has been secured to the mounting surface. In some embodiments, the backplate 604 may form the first modular section, while the head unit may form the second modular section.

In some embodiments, the third temperature sensor 614 may be less sensitive than the second temperature sensor 612 and/or the first temperature sensor 610. In one embodiment, the third temperature sensor 614 may be combined with a humidity sensor in the same integrated circuit. The reduced sensitivity of the third temperature sensor 614 may be advantageous in that it prevents the third temperature sensor 614 from responding immediately to the effects of excessive internal heating. The third temperature sensor 614 may also be used as a backup sensor in the case of a malfunctioning first temperature sensor 610 and/or second temperature sensor 612. The third temperature sensor 614 may also be used in cases where the head unit 606 is separated from the backplate 604. In some embodiments, the third temperature sensor 614 may also be used to monitor heat generated by the internal electronics of the backplate 604.

Many different types of commercially available sensors may be used to implement the various temperature sensors used by the thermostat 602. Merely by way of example, the first temperature sensor 610 and/or the second temperature sensor 612 may be implemented using the TMP112 high-precision, low-power, digital temperature sensor available from Texas Instruments®. The third temperature sensor 614 may be implemented using the SHT20 digital humidity sensor chip available from Sensirion®.

Figure 7:
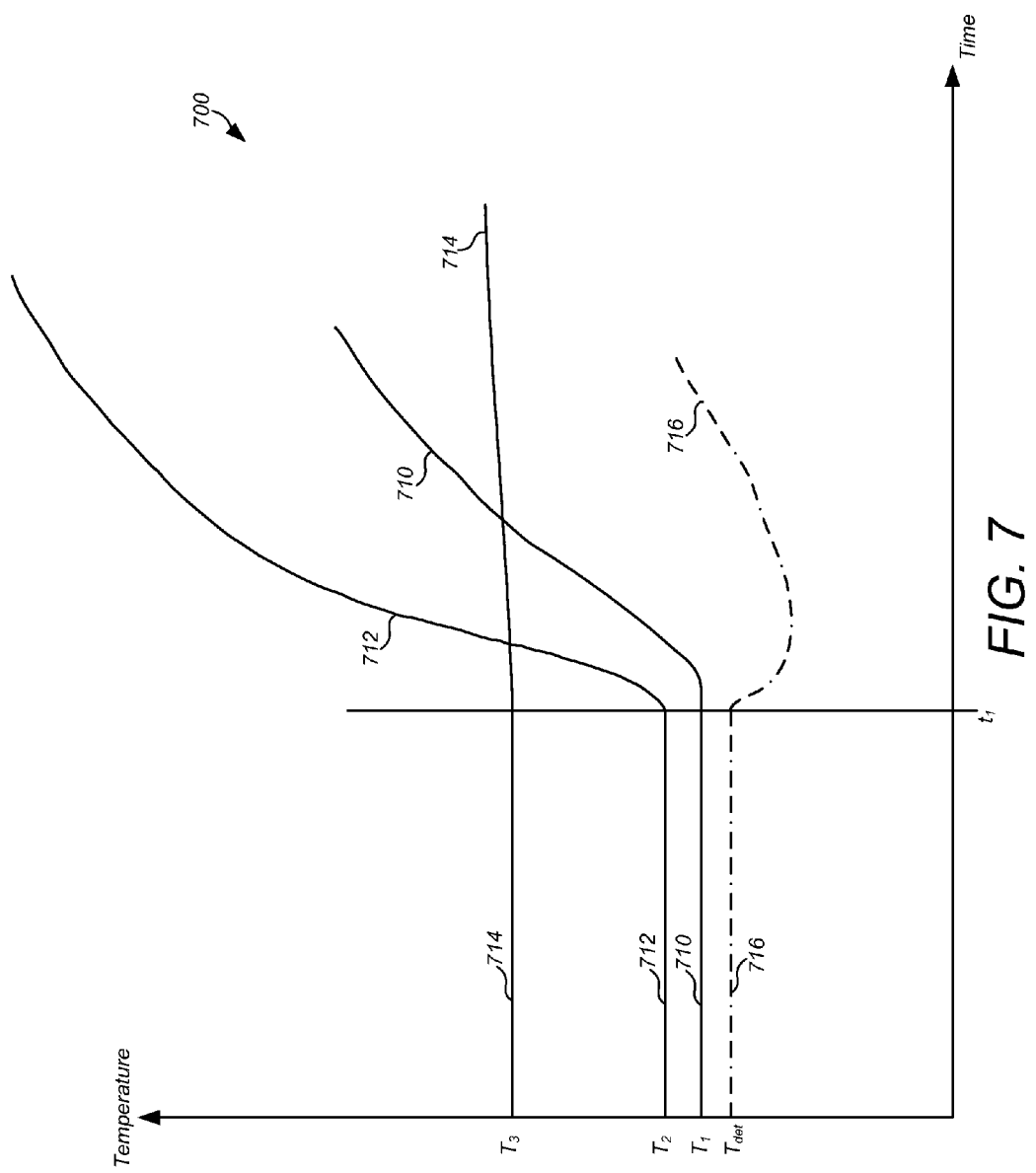
FIG. 7 illustrates a graph of the responses of three temperature sensors when the internal components of the thermostat operate in the high power mode, according to some embodiments.

FIG. 7 illustrates a graph 700 of the responses of three temperature sensors when the internal components of the thermostat begin to operate in the high power mode, according to some embodiments. The temperature measurements provided on graph 700 may correspond to the three temperature sensors described above. Specifically, curve 714 may represent temperature measurements provided over time by the third temperature sensor 614, curve 712 may represent temperature measurements provided over time by the second temperature sensor 612, and curve 710 may represent temperature measurements provided over time by the first temperature sensor 610. Curve 716 may represent the determined ambient temperature as calculated by the first temperature determination algorithm. For example, curve 716 may be generated using equation (1) as a function of $T_1$ and $T_2$.

Prior to time $t_1$, the determined ambient temperature curve 716 may be less than any of the temperature sensor measurements provided by any of the one or more temperature sensors. Generally, the more isolated the particular temperature sensor is from the ambient temperature of the enclosure, the warmer the steady-state measured temperature of the particular temperature sensor will be. Therefore, the third temperature sensor curve 714 will generally be higher than the second temperature sensor curve 712, which in turn will generally be higher than the first temperature sensor curve 710 during steady-state conditions.

At time $t_1$, it may be assumed that the temperature sensors of the thermostat begin to respond to heat generated by thermostat components operating in a high power state. Generally, the temperature sensors may begin to respond at times and at rates that are related to their thermal isolation from the heating effects of the internal components. For example, the second temperature sensor curve 712 may begin to rise first and at the fastest rate. Next, the first temperature sensor curve 710 may begin to rise at a time later than that of the second temperature sensor curve 712 and at a slower rate than that of the second temperature sensor curve 712. Similarly, the third temperature sensor curve 714 may begin to rise a later time than that of the first temperature sensor curve 710 and at a slower rate than that of the first temperature sensor curve 710.

The effects upon the determined ambient temperature curve 716 that is computed by the first ambient temperature determination algorithm may also be significant. As the difference between the first temperature sensor curve 710 and the second temperature sensor curve 712 increases, the slope of the determined ambient temperature curve 716 may decrease at an even more dramatic rate. As illustrated by FIG. 7, because of the varying effects upon the temperature sensors of the thermostat, the first ambient temperature determination algorithm may calculate a determined ambient temperature that begins to dip below the actual ambient temperature of the enclosure.

In some cases, actual data has shown that internal heating effects can corrupt the temperature calculations by as much as 1 to 5 degrees. This miscalculation has the potential to dramatically affect the HVAC system operation in financially important ways. For example, during the winter, temperature miscalculations may cause an increase in the usage of a home's heater. Heating in cold climates represents one of the most costly monthly bills for homeowners. In the summertime, the consequences may be comparably severe. Heating by internal components operating in the high-power state may cause the temperature in the house to increase every time a user interacts with the thermostat. Time-to-temperature algorithms operating within an advanced thermostat may determine that the difference between the actual temperature and the setpoint temperature is great enough that both primary and secondary HVAC systems may need to be activated. This may cause dangerous or costly conditions for a home owner.

At a time near time $t_1$, the thermostat may determine that one or more components are operating in a high-power mode. In response, the thermostat may switch between ambient temperature determination algorithms. In some embodiments, a second ambient temperature determination algorithm may be used during time intervals when the thermostat determines that internal components are heating the thermostat and causing the determined ambient temperature calculated by the first ambient temperature determination algorithm to become unreliable.

As may also be observed in FIG. 7, the third temperature sensor curve 714 is not rapidly affected by the internal heat generated by components operating in the high-power mode. As described above, the third temperature sensor 614 may be disposed within the thermostat such that it is more thermally isolated from the effects of component-related heating than the other temperature sensors. In one embodiment, the stability exhibited by the third temperature sensor 614 may be used by the second ambient temperature determination algorithm to calculate the determined ambient temperature.

Figure 8:
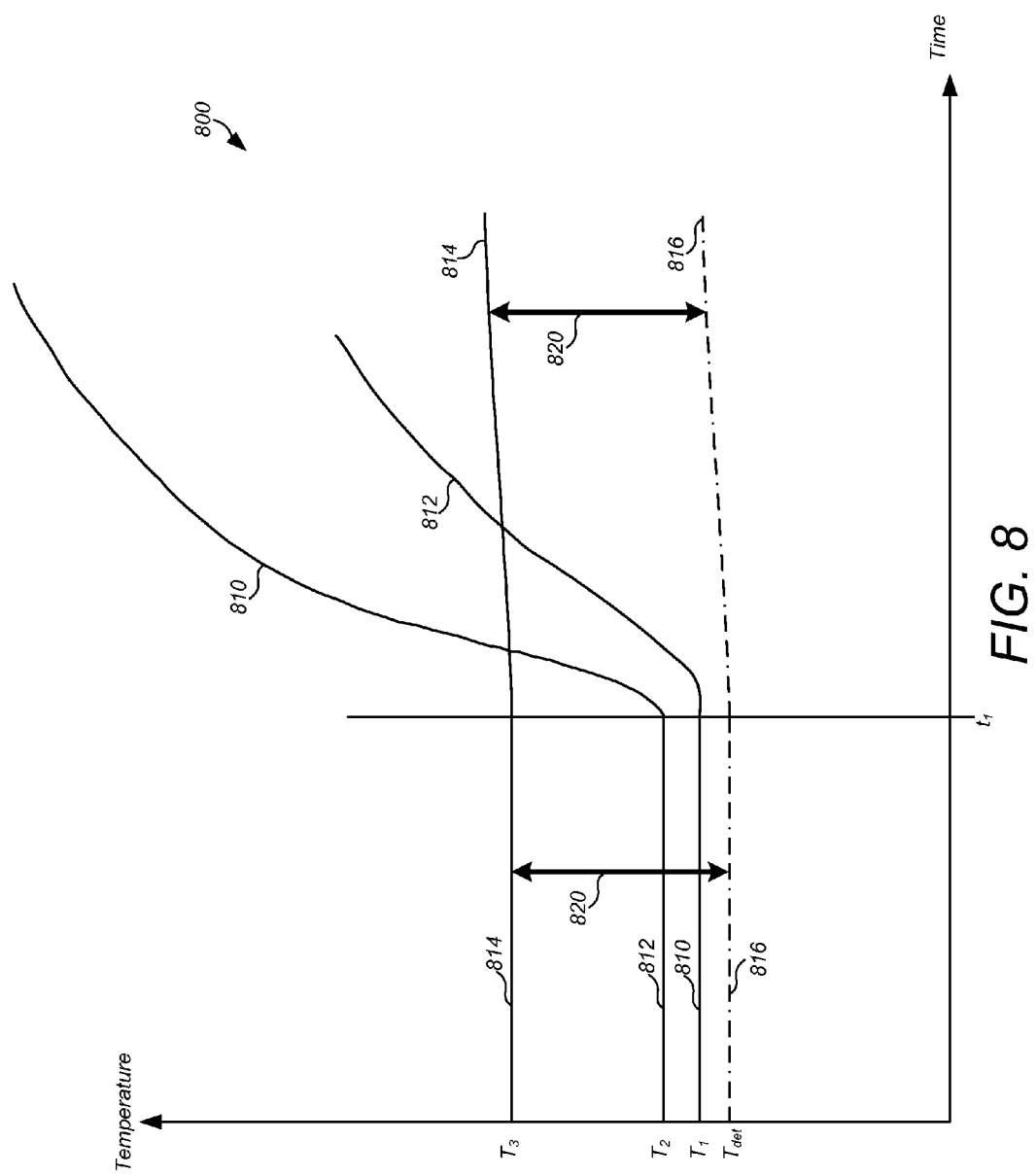
FIG. 8 illustrates a graph of the responses of three temperature sensors when the thermostat is heated by internal components operating in a high-power mode, according to some embodiments.

FIG. 8 illustrates a graph 800 of the responses of three temperature sensors when the thermostat is heated by internal components operating in a high-power mode, according to some embodiments. Curve 814 may represent temperature measurements provided over time by the third temperature sensor 614, curve 812 may represent temperature measurements provided over time by the second temperature sensor 612, and curve 810 may represent temperature measurements provided over time by the first temperature sensor 610. Curve 816 may represent the determined ambient temperature as calculated by the second temperature determination algorithm.

In some embodiments, a relationship between the third temperature sensor curve 814 and the determined ambient temperature curve 816 may be observed during time intervals where internal components are not operating in the high-power mode and thus not heating the thermostat. During these intervals, the determined ambient temperature may be calculated using the first ambient temperature determination algorithm that need not depend on the third temperature sensor. For example, an offset temperature 820 may be measured during these intervals and stored by the thermostat. Using historical data, the offset temperature 820 may be calculated using the following equation.

$$T_{offset} = T_3 - T_{det} \qquad (2)$$

During normal operations, it has been observed that the actual temperature may track the temperature measured by the third temperature sensor. In one embodiment, the offset temperature 820 may be calculated using historical values for the determined ambient temperature and measurements provided by the third temperature sensor over a time interval of approximately 30 minutes prior to detecting internal components operating in the high-power mode. Other embodiments may use other time interval lengths, such as approximately 10 minutes, 25 minutes, 35 minutes, and 1 hour. At a time near time $t_1$, the thermostat may determine that internal components are operating in the high-power mode and switch to the second ambient temperature determination algorithm. In one embodiment where the offset temperature 820 has been determined, the second ambient temperature determination algorithm may calculate the determined ambient temperature using the following equation.

$$T_{det} = T_3 - T_{offset} \qquad (3)$$

Therefore, the second ambient temperature determination algorithm may be configured to leverage the slower response of the third temperature sensor to component-related heating effects. The first ambient temperature determination algorithm may be ideal during operation in the low-power mode because it can respond quickly to temperature changes in the enclosure (e.g. someone leaves a door open in the winter); however, this ability to rapidly respond may be a detriment during operation in the high-power mode. Instead, in the embodiment described above, an arithmetic offset temperature may be subtracted from the temperature sensor measurements provided by the third temperature sensor. In other embodiments, scaling factors may be used, percentages may be calculated, and other combinations of sensors may also be used. In one embodiment, a difference between the second temperature sensor and the third temperature sensor may be used by the second ambient temperature determination algorithm. In another embodiment, measurements from all three sensors may be used to calculate the determined ambient temperature. Additional equations and combinations of temperature sensors may be derived using the principles of this disclosure to meet the needs of many different enclosures and thermostat types. The equations described above are merely exemplary, and not meant to be limiting.

While some embodiments may simply switch between the first and second ambient temperature determination algorithms when the thermostat switches between the low-power mode and the high-power mode, other embodiments may use additional sensors and algorithms to further refine the time when this switching should take place in order to minimize false negatives and false positives that may be caused by only temporary direct sunlight exposure and other artificial light sources.

In some embodiments, the transition between the determined ambient temperature calculated by the first temperature determination algorithm and the determined ambient temperature calculated by the second temperature determination algorithm might not be completely continuous. In other words, there may be an abrupt transition between calculated ambient temperatures. Therefore, it may be desirable in some embodiments to minimize false positives and false negatives by allowing the thermostat components to operate in the high-power mode for a certain period of time before switching between algorithms. For example, if a user activates the user interface for only a few seconds, the heat generated by the user interface and any processors that power the user interface might not generate an excessive amount of heat that would justify switching between ambient temperature determination algorithms.

In some embodiments, the thermostat may detect when excessive internal heat is being generated by analyzing the raw temperature measurements of the second temperature sensor. For example, a rapid increase in temperature over a short period of time may indicate that thermostat components are generating excessive heat that may distort the determined ambient temperature calculations. However, relying on the second temperature sensor measurements to determine when the second temperature sensor measurements are becoming unreliable may be problematic in theory and in practice. Instead, some embodiments may use detecting operation in the high-power mode for a certain period of time as a proxy for detecting excess heat. Some embodiments may combine aspects of these two methods and made both detect when components are operating in the high-power mode and when excessive heat is being generated based on divergence of a measured or calculated temperature in comparison to an expected value.

Figure 9:
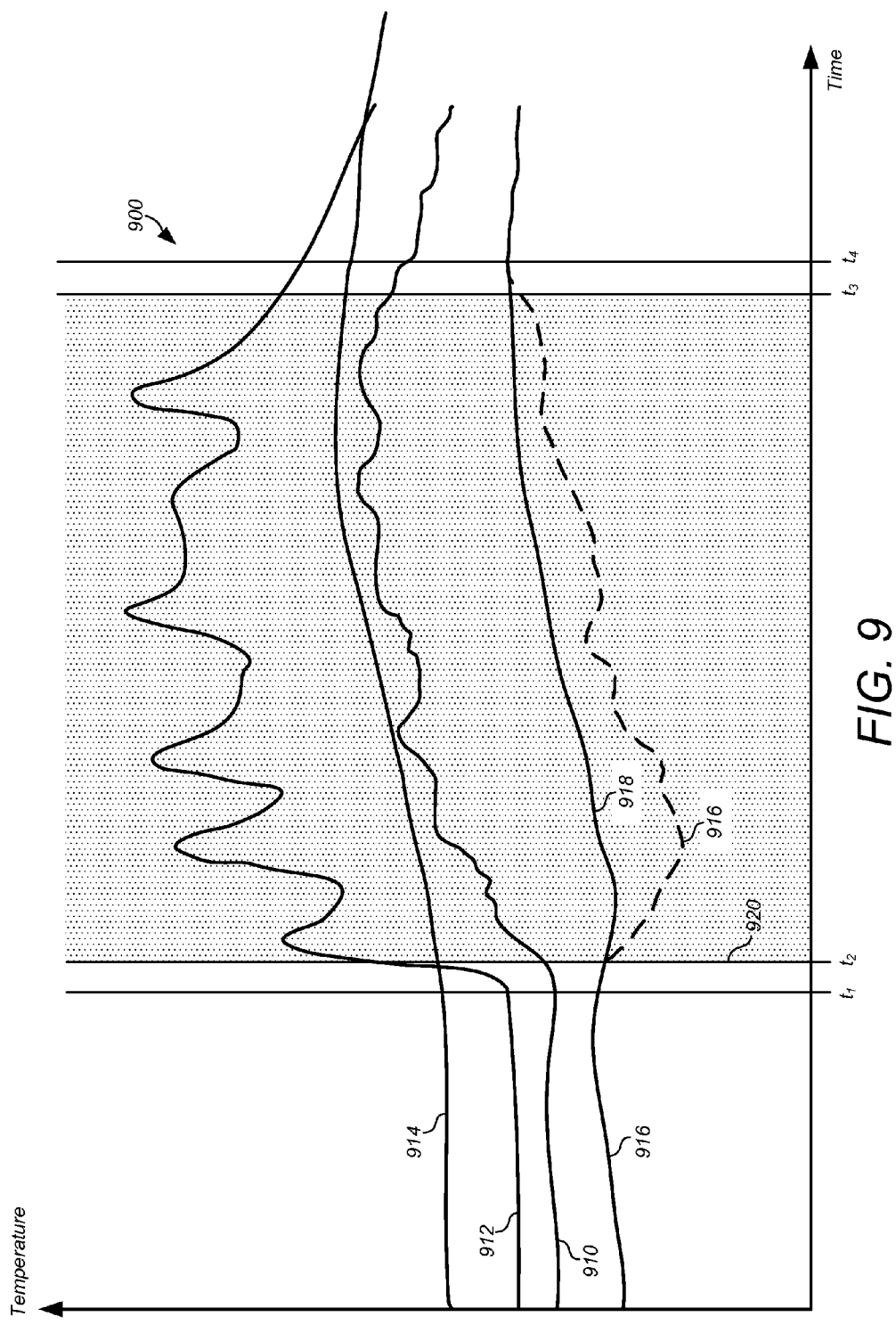
FIG. 9 illustrates a graph of actual temperature measurements as the thermostat switches between the first and second ambient temperature determining algorithms, according to some embodiments.

FIG. 9 illustrates a graph 900 of actual temperature measurements as the thermostat switches between the first and second ambient temperature determining algorithms, according to some embodiments. At time $t_1$, one or more of the components of the thermostat may begin operating in a high-power state. For example, a user interface may be activated in response to a user manipulation of a thermostat input control. In other cases, a main processor may wake up to perform temperature calculations. In other cases, power stealing circuitry may enter into a power stealing mode that generates excessive internal heat. In other cases, an HVAC function may be actuated such that internal power transistors may generate excessive heat. In some cases, a combination of any of these circumstances may also be detected.

Although the thermostat may detect one or more components beginning to operate in a high-power mode at time $t_1$, the thermostat need not switch from the first ambient temperature determination algorithm to the second ambient temperature determination algorithm at time $t_1$. Instead, the thermostat may wait for a first time interval to make sure that the one or more components operate in the high-power mode for a sufficient amount of time to generate excessive internal heat. For example, the first time interval may be represented as the difference between time $t_1$ and time $t_2$. Accordingly, at time $t_2$, the thermostat may switch to use the second ambient temperature determination algorithm.

In FIG. 9, the first temperature sensor curve 910, the second temperature sensor curve 912, and the third temperature sensor curve 914 may all begin to increase as the thermostat begins to be heated by components operating in the high-power mode. Note that as described above, the curve corresponding to each temperature sensor changes at different rates and times based on their location and thermal isolation within the thermostat housing relative to the heat-generating components.

As the first temperature sensor curve 910 and the second temperature sensor curve 912 begin to increase and diverge, the determined ambient temperature curve 916 begins to decrease according to the first ambient temperature determination algorithm. At this point, the thermostat may switch to the second ambient temperature determining algorithm. The results of this switch may be seen by determined ambient temperature curve 918.

Instead of simply relying on detecting components operating in the high-power mode, some embodiments may first detect components operating in the high-power mode, then detect a temperature divergence. For example, at time $t_1$, the thermostat may detect components operating in the high-power mode. At some point between time $t_1$ and time $t_2$, the thermostat may determine that the components have operated in the high-power mode for a sufficient time interval to begin watching for temperature divergence. As the second temperature sensor curve 912 begins to diverge from either the third temperature sensor curve 916, the first temperature sensor curve 910, and/or the determined ambient temperature curve 916, a temperature divergence may be detected. As used herein, a temperature divergence may refer to an instance where the current difference between the second temperature sensor and the third temperature sensor exceeds the historical difference by some margin (e.g., 0.3° C.). Alternatively, the determined ambient temperature curve 916 may be compared to any of the other temperature curves to detect a temperature divergence. At time $t_2$, the thermostat may determine that (i) one or more components are operating the high-power mode for a sufficient period of time, and (ii) that a temperature divergence has been detected, and consequently switch to the second ambient temperature determination algorithm. Determined ambient temperature curve 918 represents the determined ambient temperature calculated by the second ambient temperature determination algorithm.

In some cases, the transition between determined ambient temperature curve 916 and determined ambient temperature curve 1118 may be abrupt and/or discontinuous. This abrupt change may cause unintended consequences in the control of the HVAC system. In order to smooth this transition, some embodiments may use low pass filtering techniques. One embodiment may use an averaging sliding window that averages the last five to ten temperature measurements at, for example, 30 second intervals. Other window length and interval lengths may also be used. In other embodiments, discrete time domain operations may apply digital filters to the determined ambient temperatures to smooth the transition.

In order to switch back to the first ambient temperature determination algorithm, the thermostat may detect when the one or more components transition out of the high-power operating mode back into the low-power operating mode. Some embodiments may immediately switch between ambient temperature determination algorithms. Other embodiments may again wait a certain interval of time before switching algorithms after a transition between operating modes has been detected. For example, at time $t_3$ the thermostat may detect that the one or more components of transition back into the low-power operating mode. After a certain time interval has passed, the thermostat may switch back to the first ambient temperature determination algorithm, such as at time $t_4$. Some embodiments may also look for a temperature convergence that is substantially the opposite of the temperature divergence detected earlier. For example, a temperature convergence may indicate that the current difference between the second temperature sensor and the third temperature sensor is within the historical difference by some margin (e.g. 0.15° C.). In some embodiments, there may be a difference between the margins used for divergence (e.g. 0.3° C.) and convergence (0.15° C.) as a form of hysteresis to avoid frequently triggering convergence/divergence. Some embodiments may watch for both temperature convergence and the one or more components operating in the low-power state for more than a certain time interval, and switch back to the first ambient temperature determination algorithm when either condition is met.

Figure 10:
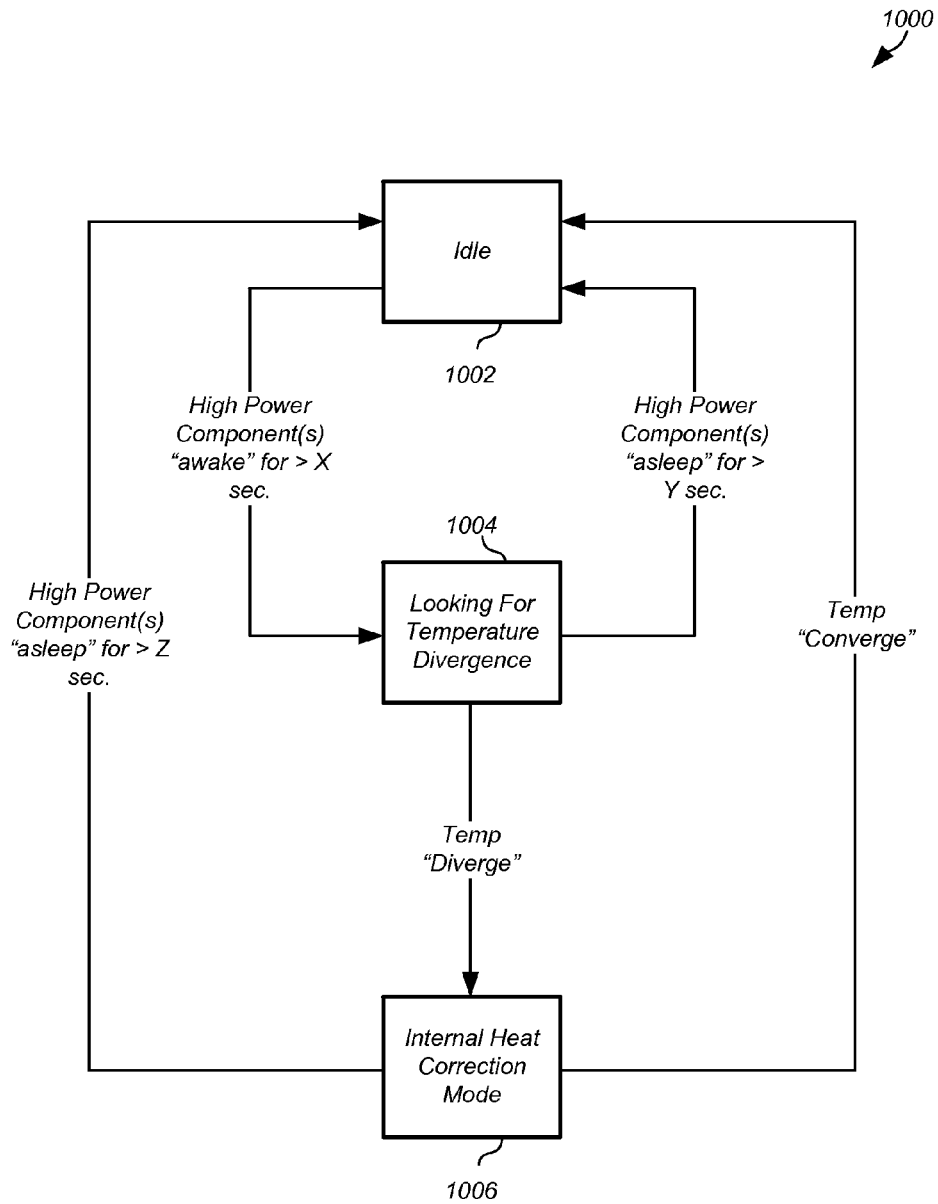
FIG. 10 illustrates a flowchart of an algorithm that may be used to switch between ambient temperature determination algorithms, according to some embodiments.

FIG. 10 illustrates a flowchart 1000 of an algorithm that may be used to switch between ambient temperature determination algorithms, according to some embodiments. Flowchart 1000 may be implemented in software and/or hardware by a state machine. This algorithm may use both detecting component operating modes and temperature divergence/convergence to switch between ambient temperature determination algorithms.

In embodiments where the thermostat is divided into a head unit and a backplate, the temperature switching algorithm can be run by the head unit processor. The head unit processor can then store transition temperatures and/or operating mode indications in the backplate processor. Sometimes, the head unit processor may step through different stages of the state machine represented by flowchart 1200 each time the head unit processor wakes up. In some cases, multiple stages may be stepped through in each wake cycle, while in other cases, the state machine may remain idle.

During normal operation, the thermostat may reside in the idle state 1002 while the internal components of the thermostat operate in the low-power mode. While in the idle state 1002, the thermostat may detect time intervals wherein one or more components operates in the high-power state. After one or more components operates in the high-power state for more than "X" seconds, the thermostat may transition into state 1004 to begin looking for temperature divergence.

While in state 1004, the thermostat may monitor the one or more components to detect transitions to the low-power state for more than "Y" seconds. In some embodiments, transitioning into state 1004 may only require one or more of a plurality of internal components operating in the high-power state for more than "X" seconds. In contrast, transitioning out of state 1004 back to the idle state 1002 may require all of the internal components to operate in the low-power state for more than "Y" seconds.

While in state 1004, if a temperature divergence is detected, then the thermostat may transition into state 1006 and begin using the second ambient temperature determination algorithm to calculate the determined ambient temperature. In one embodiment, a temperature divergence may be defined as the instantaneous difference between the second temperature sensor and the third temperature sensor being greater by a threshold amount than the historical difference between the second temperature sensor and the third temperature sensor. In one embodiment, the threshold amount may be approximately 0.3° C.

While in state 1006, the thermostat may monitor two different conditions. First, the thermostat may watch the one or more components to determine when they have all been asleep or operating in a low-power mode for more than "Z" seconds. When this condition is met, the thermostat may transition back into the idle state 1002. In other words, the internal components may switch back to the low-power operating mode without necessarily seeing a temperature convergence. This may occur when the ambient enclosure temperature decreases enough that a corresponding increase in the determined ambient temperature may not be observed.

While in state 1006, the thermostat may monitor a second condition, namely temperature convergence. In some embodiments, temperature convergence may be defined as the instantaneous difference between the second temperature sensor and the third temperature sensor being smaller by a threshold amount than the historical difference between the second temperature sensor and the third temperature sensor. In one embodiment, the threshold amount may be approximately 0.15° C.

The times used for each transition in flowchart 1000 (i.e. "X", "Y", and "Z") may be determined experimentally for each type of thermostat and/or each type of enclosure. In some embodiments, "X" may correspond to approximately 20 seconds, "Y" may correspond to approximately 900 seconds, and/or "Z" may correspond to approximately 7200 seconds.

The states and steps illustrated by flowchart 1000 are merely exemplary, and not meant to be limiting. Other embodiments may add additional states and additional criteria for transitioning between states. One example where additional states may be added to flowchart 1000 involves heating caused by direct sunlight. Time intervals may be detected using an ambient light sensor (ALS) where the thermostat is exposed to direct sunlight for an extended time. The direct sunlight may cause the various temperature sensors to heat up non-uniformly and thereby further distort the temperature calculations. Generally, the direct sunlight heating problem may be solved in the same way that the heating problem due to excessive internal heat generation may be solved. When direct sunlight heating is detected, the thermostat may switch to the second temperature determination algorithm, as the third temperature sensor is less susceptible to direct sunlight heating effects. While the ambient temperature determination algorithms may be similar, detecting a direct sunlight heating event may be different from detecting heating due to internal components operating a high-power mode. A complete explanation of how to detect and compensate for direct sunlight heating may be found in the commonly-assigned U.S. patent application Ser. No. 13/835,321 entitled "HVAC Controller Configurations That Compensate for Heating Caused by Direct Sunlight" filed on Mar. 15, 2013 and hereby incorporated by reference for all purposes.

In embodiments that compensate for both direct sunlight exposure and internal heating by components operating in the high-power mode, the same state machine infrastructure may be used for each operation. This may simplify calculations and may require only a single set of wake-up conditions for a high-power processor. More importantly, the signatures of direct sunlight heating and heating caused by internal components may oppose each other. With direct sunlight, the first temperature sensor may heat first followed by the second temperature sensor causing an increase in the determined ambient temperature. With self-heating, the second temperature sensor heats first followed by the first temperature sensor causing a decrease in the determined ambient temperature. Thus in some embodiments divergence may be used to detect sunlight heating, whereas convergence can be used to detect self-heating.

In combining the state machine compensating for direct sunlight heating with the state machine compensating for internal heating, a heightened state of awareness may be entered by detecting either an ALS spike or components operating in the high-power mode. After entering the heightened state of awareness, the state machine may then look for temperature divergence/convergence in order to switch to the second ambient temperature determination algorithm. In some embodiments, there may be a relative priority between the various conditions that may cause temperature anomalies. For example, the sunlight correction portion of the state machine may have a higher priority than the self-heating temperature correction portion of the state machine. Therefore, in the case of an ALS Spike, the state machine may transition based on the sunlight correction mode without regard for the high/low power operational mode of the thermostat internal components. In the absence of an ALS Spike, the state machine may instead operate according to the temperature correction state machine.

Whereas many alterations and modifications of the present invention will no doubt become apparent to a person of ordinary skill in the art after having read the foregoing description, it is to be understood that the particular embodiments shown and described by way of illustration are in no way intended to be considered limiting. Therefore, reference to the details of the preferred embodiments is not intended to limit their scope.

What is claimed is:

1. A thermostat, comprising:
    a housing;
    a user interface;
    one or more temperature sensors, each of the one or more temperature sensors being configured to provide temperature sensor measurements, wherein said one or more temperature sensors includes a first temperature sensor, a second temperature sensor, and a third temperature sensor, each being positioned at different locations relative to the housing; and
    a processing system disposed within the housing, the processing system being configured to be in operative communication with the one or more temperature sensors to receive the temperature sensor measurements, in operative communication with one or more input devices including said user interface for determining a setpoint temperature, and in still further operative communication with a heating, ventilation, and air conditioning (HVAC) system to control the HVAC system based on a comparison of a determined ambient temperature and the setpoint temperature, wherein said processing system is configured to:
    (i) operate in a plurality of operating states including a first operating state characterized by relatively low power consumption and a corresponding relatively low associated heat generation and a second operating state characterized by relatively high power consumption and a corresponding relatively high associated heat generation;
    (ii) during time intervals in which the processing system is operating in the first operating state, process the temperature sensor measurements according to a first ambient temperature determination algorithm based on readings from said first and second temperature sensors and not based on readings from said third temperature sensor to compute the determined ambient temperature; and
    (iii) during time intervals in which the processing system is operating in the second operating state, process the temperature sensor measurements according to a second ambient temperature determination algorithm based on readings from said third temperature sensor to compute the determined ambient temperature.

2. The thermostat of claim 1, wherein the third temperature sensor is disposed on a portion of the thermostat such that the third temperature sensor is less susceptible to the heating by the processing system than the first temperature sensor.

3. The thermostat of claim 1, wherein the second ambient temperature determination algorithm calculates the determined ambient temperature using (i) temperature measurements provided by the third temperature sensor, and (ii) an offset calculated during the time intervals in which the processing system is operating in the first operating state.

4. The thermostat of claim 1, wherein the thermostat comprises a first modular section and a second modular section, the third temperature sensor being disposed in the first modular section, the first temperature sensor being disposed in the second modular section, and the second temperature sensor being disposed in the second modular section.

5. The thermostat of claim 1, wherein the second temperature sensor is disposed on a portion of the thermostat such that the second temperature sensor is more susceptible to the heating by the processing system than the first temperature sensor and the third temperature sensor.

6. The thermostat of claim 1, wherein the processing system comprises:
    a low-power processor; and
    a high-power processor, wherein the high-power processor is configured to calculate temperature thresholds to be stored by the low-power processor, the low-power processor being configured to wake the high-power processor from a sleep state when one or more of the thresholds are violated by the determined ambient temperature.

7. The thermostat of claim 1, wherein during the time intervals in which the processing system is operating in the second operating state, the processing system is further configured to:
    (i) detect a change in the determined ambient temperature; and
    (ii) switch from the first ambient temperature determination algorithm to the second ambient temperature determination algorithm after detecting said change in the determined ambient temperature.

8. The thermostat of claim 7, wherein the processing system is further configured to switch from the first ambient temperature determination algorithm to the second ambient temperature determination algorithm after determining that the processing system has been operating in the second operating state for a predetermined time interval.

9. A method of compensating for internal heating in a thermostat, the method comprising:
    determining, using a processing system of the thermostat, a current operating state of the processing system, wherein the thermostat comprises:
    a housing;
    a user interface;

one or more temperature sensors, each of the one or more temperature sensors being configured to provide temperature sensor measurements, wherein said one or more temperature sensors includes a first temperature sensor, a second temperature sensor, and a third temperature sensor, each being positioned at different locations relative to the housing; and a processing system disposed within the housing, the processing system being configured to be in operative communication with the one or more temperature sensors to receive the temperature sensor measurements, in operative communication with one or more input devices including said user interface for determining a setpoint temperature, and in still further operative communication with a heating, ventilation, and air conditioning (HVAC) system to control the HVAC system based on a comparison of a determined ambient temperature and the setpoint temperature, wherein said processing system is configured to operate in a plurality of operating states including a first operating state characterized by relatively low power consumption and a corresponding relatively low associated heat generation and a second operating state characterized by relatively high power consumption and a corresponding relatively high associated heat generation;

during time intervals in which the processing system is operating in the first operating state, processing the temperature sensor measurements according to a first ambient temperature determination algorithm based on readings from said first and second temperature sensors and not based on readings from said third temperature sensor to compute the determined ambient temperature; and during time intervals in which the processing system is operating in the second operating state, processing the temperature sensor measurements according to a second ambient temperature determination algorithm based on readings from said third temperature sensor to compute the determined ambient temperature.

10. The method of claim 9, wherein the third temperature sensor is disposed on a portion of the thermostat such that the third temperature sensor is less susceptible to the heating by the processing system than the first temperature sensor.

11. The method of claim 9, wherein the second ambient temperature determination algorithm calculates the determined ambient temperature using (i) temperature measurements provided by the third temperature sensor, and (ii) an offset calculated during the time intervals in which the processing system is operating in the first operating state.

12. The method of claim 9, wherein the thermostat comprises a first modular section and a second modular section, the third temperature sensor being disposed in the first modular section, the first temperature sensor being disposed in the second modular section, and the second temperature sensor being disposed in the second modular section.

13. The method of claim 9, wherein the second temperature sensor is disposed on a portion of the thermostat such that the second temperature sensor is more susceptible to the heating by the processing system than the first temperature sensor and the third temperature sensor.

14. The method of claim 9, wherein the processing system comprises:
a low-power processor; and
a high-power processor, wherein the high-power processor is configured to calculate temperature thresholds to be stored by the low-power processor, the low-power processor being configured to wake the high-power processor from a sleep state when one or more of the thresholds are violated by the determined ambient temperature.

15. The method of claim 9, further comprising, during the time intervals in which the processing system is operating in the second operating state:
detecting a change in the determined ambient temperature; and
switching from the first ambient temperature determination algorithm to the second ambient temperature determination algorithm after detecting said change in the determined ambient temperature.

16. The method of claim 15, wherein the processing system is further configured to switch from the first ambient temperature determination algorithm to the second ambient temperature determination algorithm after determining that the processing system has been operating in the second operating state for a predetermined time interval.

17. A thermostat, comprising:
one or more temperature sensors comprising a first temperature sensor, a second temperature sensor, and a third temperature sensor, each of the one or more temperature sensors being configured to provide temperature sensor measurements, the third temperature sensor being located such that it is less susceptible to internal heating effects than the first temperature sensor and the second temperature sensor; and
a processing system, the processing system being configured to be in operative communication with the one or more temperature sensors to receive the temperature sensor measurements, and configured to be in operative communication with a heating, ventilation, and air conditioning (HVAC) system to control the HVAC system based on a comparison of a determined ambient temperature and a setpoint temperature, wherein said processing system is configured to:
(i) operate in a plurality of operating states including a first operating state characterized by relatively low power consumption and a corresponding relatively low associated heat generation and a second operating state characterized by relatively high power consumption and a corresponding relatively high associated heat generation;
(ii) during time intervals in which the processing system is operating in the first operating state, process the temperature sensor measurements according to a first ambient temperature determination algorithm to compute the determined ambient temperature; and
(iii) during time intervals in which the processing system is operating in the second operating state, process the temperature sensor measurements according to a second ambient temperature determination algorithm to compute the determined ambient temperature, wherein the second ambient temperature determination algorithm uses temperature sensor measurements from the third temperature sensor.

18. The thermostat of claim 17 wherein the first ambient temperature determination algorithm uses temperature sensor measurements from the first temperature sensor and the second temperature sensor.

19. The thermostat of claim 17 wherein the second temperature sensor is disposed such that the second temperature sensor is more susceptible to internal heating effects than the first temperature sensor and the third temperature sensor.

20. The thermostat of claim 17 wherein the processing system is further configured to switch from the first ambient temperature determination algorithm to the second ambient temperature determination algorithm after determining that the processing system has been operating in the second operating state for a predetermined time interval.

* * * * *